United States Patent
Horikawa

(10) Patent No.: US 9,891,962 B2
(45) Date of Patent: Feb. 13, 2018

(54) LOCK MANAGEMENT SYSTEM, LOCK MANAGEMENT METHOD AND LOCK MANAGEMENT PROGRAM

(71) Applicant: NEC Corporation, Tokyo (JP)

(72) Inventor: Takashi Horikawa, Tokyo (JP)

(73) Assignee: NEC Corporation, Tokyo (JP)

(*) Notice: Subject to any disclaimer, the term of this patent is extended or adjusted under 35 U.S.C. 154(b) by 378 days.

(21) Appl. No.: 14/403,340

(22) PCT Filed: Mar. 26, 2013

(86) PCT No.: PCT/JP2013/058789
§ 371 (c)(1),
(2) Date: Nov. 24, 2014

(87) PCT Pub. No.: WO2013/175858
PCT Pub. Date: Nov. 28, 2013

(65) Prior Publication Data
US 2015/0106542 A1    Apr. 16, 2015

(30) Foreign Application Priority Data
May 23, 2012   (JP) .................. 2012-117605

(51) Int. Cl.
*G06F 12/00* (2006.01)
*G06F 9/52* (2006.01)
*G06F 17/30* (2006.01)

(52) U.S. Cl.
CPC .............. *G06F 9/524* (2013.01); *G06F 9/526* (2013.01); *G06F 9/52* (2013.01); *G06F 17/30008* (2013.01); *G06F 2209/523* (2013.01)

(58) Field of Classification Search
None
See application file for complete search history.

(56) References Cited

U.S. PATENT DOCUMENTS

| 7,472,237 B1* | 12/2008 | Herbst | G06F 9/5027 |
| | | | 711/152 |
| 2002/0120428 A1* | 8/2002 | Christiaens | G06F 9/465 |
| | | | 702/186 |

(Continued)

FOREIGN PATENT DOCUMENTS

| JP | 9-305471 | 11/1997 |
| JP | 10-254769 | 9/1998 |
| WO | WO 2011/096163 A1 | 8/2011 |

OTHER PUBLICATIONS

"Intel® 64 and IA-32 Architectures Software Developer's Manual", vol. 2A [online]; [retrieved May 11, 2000]; Internet URL:http://www.intel.com/Assets/PDF/manual/253666.pdf.

(Continued)

*Primary Examiner* — Henry Tsai
*Assistant Examiner* — Aurangzeb Hassan
(74) *Attorney, Agent, or Firm* — Finnegan, Henderson, Farabow, Garrett & Dunner, L.L.P.

(57) ABSTRACT

Provided is a lock management system, a lock management method and a lock management program whereby lock acquisition and release processes can be carried out at high speed.

A lock management system 1 having a multiprocessor includes: a lock acquisition process 310 for carrying out a lock acquisition process for a thread according to one or more lock modes, at least a portion of the lock modes being a shared lock that can be acquired by one or more threads; and lock status holding means 410 for managing the number of threads acquiring a lock, by first information which can express the number of threads by one word that can be handled by an indivisible access command of the multi- (Continued)

processor, and second information representing a whole range of the number of threads that can possibly acquire a lock in each lock mode.

6 Claims, 34 Drawing Sheets

(56) References Cited

U.S. PATENT DOCUMENTS

| 2007/0198792 | A1* | 8/2007 | Dice | G06F 9/466 |
| | | | | 711/163 |
| 2008/0184238 | A1* | 7/2008 | Ruemmler | G06F 9/485 |
| | | | | 718/102 |
| 2010/0023707 | A1* | 1/2010 | Hohmuth | G06F 9/466 |
| | | | | 711/152 |
| 2012/0005684 | A1* | 1/2012 | Ziarek | G06F 9/528 |
| | | | | 718/103 |
| 2012/0304185 | A1 | 11/2012 | Horikawa | |
| 2013/0290583 | A1* | 10/2013 | Dice | G06F 9/526 |
| | | | | 710/200 |
| 2013/0290967 | A1* | 10/2013 | Calciu | G06F 9/526 |
| | | | | 718/102 |

OTHER PUBLICATIONS

PostqreSQL 9.0.7 Documentation Chapter 13 Concurrency Control [online]; [retrieved May 11, 2000]; Internet URL:http://www.postgresql.org/docs/9.0/static/explicit-locking.html.
International Search Report dated May 14, 2013 in corresponding PCT International Application.

* cited by examiner

LOCK MANAGEMENT SYSTEM, LOCK MANAGEMENT METHOD AND LOCK MANAGEMENT PROGRAM

CROSS-REFERENCE TO RELATED PATENT APPLICATIONS

This application is a National Stage Entry of International Application No. PCT/JP2013/058789, filed Mar. 26, 2013, which claims priority from Japanese Patent Application No. 2012-117605, filed May 23, 2012. The entire contents of the above-referenced applications are expressly incorporated herein by reference.

BACKGROUND

The various modes relating to the present invention relate to a lock management system, a lock management method and a lock management program in a multiprocessor system.

In a computer system, a plurality of processes and threads are generally run in parallel in order to make efficient use of computer resources, such as a processor. Although processes and threads are not strictly the same, they are similar concepts in meaning a unit of program execution, and therefore, in the description given below, all of the units of program execution are called threads.

In an information system which is composed in such a manner that a plurality of threads are executed simultaneously in parallel by having a plurality of processors, there are cases where a plurality of threads, in parallel, access data which is located in a memory. If the data that is accessed by the respective threads is mutually independent, then there is no problem if the plurality of threads access in parallel in the memory. However, if a plurality of threads access related data, or the same data, without being aware of the other thread(s), then there may be cases where a different result is obtained to a case where the data is accessed by a single thread.

For example, it is possible to envisage an operation in which two threads increment the same variable by 1, in other words, an operation in which both threads read out the variable, increment the variable by 1 and then write back the result. If two threads are executed in a sequence in which a second thread carries out processing for incrementing the variable by 1 after a first thread has completed processing for incrementing the variable by 1, then the value of the variable is incremented by 2. Considering the processing contents of the threads, this is a correct result. On the other hand, if the two threads are executed in parallel, then processing may be executed in a sequence by which, for example, the second thread reads out the variable after the first thread has read out the variable and before the first thread has written back a result incremented by 1. If the processing advances according to this sequence, then both threads rewrite the variable as the initial value incremented by 1, without being aware of the updating of the variable by the other thread, and therefore the value of the variable is incremented by 1 only, despite the fact that there are two threads which have carried out processing for incrementing the variable by 1. In other words, a correct result is not obtained in this case.

A processing time period where a problem occurs if processing of one thread is carried out during the processing of another thread (in the example described above, the time period from the thread reading out the data until writing back the value of the processing result) is called a "critical session". In order to obtain a correct processing result, it is necessary to implement explicit control so that there is no interrupt of processing of one thread, while another thread is executing processing in a critical session.

Apart from the simplest mode of a critical session in which only one thread can be executed, there are also critical sessions in which the number of executable threads is limited, and critical sessions which have two types of lock mode, namely, an exclusive lock (write lock) and a shared lock (read lock). A critical session in which the number of executable threads is limited can be understood as a critical session in which only one thread can be executed, which is generalized on the basis of the upper limit of the number of executable threads. In a critical session which has a shared lock and an exclusive lock, the number of threads that can acquire an exclusive lock and execute critical session processing is limited to 1, whereas with a shared lock, there is no limit of the number of threads that can be executed simultaneously and threads can acquire a shared lock and execute critical session processing, provided that there is no thread that has acquired an exclusive lock.

Furthermore, as an extension of a critical session having a shared lock and an exclusive lock, there are also lock modes in which a plurality of lock modes are prepared and the number of threads which can coexist in respective modes is specified. Non-Patent Document 1 discloses one example of a complex lock of this kind. In the method described in Non-Patent Document 1, eight lock modes are specified: "ACCESS SHARE", "ROW SHARE", "ROW EXCLUSIVE", "SHARE UPDATE EXCLUSIVE", "SHARE", SHARE ROW EXCLUSIVE", "EXCLUSIVE", "ACCESS EXCLUSIVE". The relationships between the (non-conflicting) lock modes which can be executed simultaneously and the (conflicting) lock modes which cannot be executed simultaneously are specified in each lock mode in Table 13-2. In a locking method which has a plurality of modes of this kind, the locks of various modes can be handled in an integrated fashion by specifying conflict relationship table.

In a multiprocessor system having a plurality of processors, a general method for achieving a critical session uses flags (called "lock words" below) to indicate whether or not there exists a process which is currently executing a critical session. In the case of the simplest lock, a thread which is seeking to enter a critical session firstly confirms the lock word, and if the lock word is a value indicating out-of-use (called "unlock" below), then the thread changes the lock word to a value indicating in-use (called "locked" below) and executes critical session processing. On the other hand, if the confirmed lock mode is "locked", then the thread waits for that lock word to become "unlocked", and then changes the lock word to "locked" and executes critical session processing. Furthermore, when the thread has completed the execution of the critical session, the thread carries out a process for returning the lock word to "unlocked". By control of this kind, it is possible to avoid the occurrence of a problem where a thread executed by one processor executes a critical session simultaneously with a thread executed by another processor (where the processes conflict)

In the case of a locking method in which there are two types of lock mode, namely, an exclusive lock and a shared lock, the lock status can be expressed by: (1) one bit which indicates whether or not there is a thread which is executing a critical session by having acquired an exclusive lock, and (2) a plurality of bits indicating the number of threads which are executing a critical session by having acquired a shared lock (the number of bits capable of expressing the maximum number of threads). If these two types of information can fall within one word that can be handled by an indivisible (atomic) access command of the processor, then this locking method can be achieved by using this command.

One example of an indivisible (atomic) access command is a cmpxchg command which has been created for Intel x86 processors (see Non-Patent Document 2). The cmpxchg command is a command that uses three operands: a register (eax register) reserved by the command, a register operand, and a memory operand. Consequently, the cmpxchg command indivisibly carries out a series of operations: (1) reading in the value of the memory operand to the processor; (2-1) writing the value of the register operand to the memory if the value of the memory operand matches the value in the eax register; and (2-2) writing the value of the memory operand to the eax register if the value does not match the value in the eax register. Here, "indivisibly" means that it is guaranteed by a hardware operation that another processor will not access the memory during the memory writing operation in (1) and the memory writing operation in (2-1).

Furthermore, it is possible to determine which of (2-1) and (2-2) has been executed by the cmpxchg command by investigating whether or not the value in the eax register after executing a CAS command has changed compared to the value before executing the command. This operation performed by the cmpxchg command is called "CAS" (Compare And Swap) below. Apart from the CAS operation, the indivisible (atomic) commands of the processor include a command for reading out one word in the memory, applying the four arithmetic operators or a logic calculation, and then writing the result to the same memory position. With this indivisible calculation command, it is guaranteed that memory access will not be performed by another processor between the initial memory reading operation and the operation for writing the calculation result to the memory.

The method for achieving a locking method having lock modes of two types, namely, an exclusive lock and a shared lock using a CAS operation is as described below. The thread which is seeking to acquire a lock firstly reads in the lock word and then investigates whether or not a lock conflicting with the lock of the mode that the thread is seeking to acquire has been acquired. More specifically, it is confirmed that (1) there is no thread that has already acquired both an exclusive lock and a shared lock, if the mode that the thread is seeking to acquire is an exclusive lock, and that (2) there is no thread that has acquired an exclusive lock, if the mode that the thread is seeking to acquire is a shared lock. If, as a result of this, a lock conflicting with the lock of the mode that the thread is seeking to acquire has not been acquired, then a CAS operation may be performed in respect of the lock word, by setting the lock word in a state where the lock of the mode that the thread is seeking to acquire has been acquired, as the new value, and setting the value of the lock word read out in the previous operation, as the old value.

Here, the specific value of the new value is: (1) a value setting one bit that indicates whether or not there is a thread that has acquired an exclusive lock, from among the lock words, and is executing a critical session, if the mode that the thread is seeking to acquire is an exclusive lock; and (2) a value obtained by incrementing by 1 the number represented by the plurality of bits indicating the value of the threads which have acquired a shared lock, from among the lock words, and are executing a critical session, if the mode that the thread is seeking to acquire is a shared lock. Thereupon, if the CAS operation described above is successful, then that thread successfully acquires a lock, and starts to execute a critical session. If this CAS operation fails, then the value of the lock word read out in the CAS operation is set as the old value and the procedure is carried out again from the beginning. Furthermore, if, as a result of investigating the lock word that has been read out, a lock has been acquired which conflicts with the lock of the mode that the thread is seeking to acquire, then a wait is performed until this conflicting lock is released.

As described above, in all of the specified lock modes, if the number of threads that have acquired a lock in the modes can be expressed by one word which can be handled by an indivisible access command of the processor, then it is possible to achieve a lock acquisition operation by a simple format of reading out the word and then performing a CAS access.

On the other hand, in a case of a locking method in which a plurality of lock modes are prepared and the number of threads that can coexist between the modes is specified, then, in all of the specified lock modes, the number of threads that have acquired a lock in the modes cannot be expressed by one word which can be handled by an indivisible access command of the processor, and therefore it is not possible to achieve a lock acquisition operation by a simple format such as that described above.

In this way, for all of the specified lock modes, a sequence holding the number of threads that have acquired a lock in those modes, and a mechanism for exclusively controlling access to that sequence (called a "mutex" below) are prepared. With this scheme, a thread acquiring a lock firstly acquires a mutex, and then determines whether or not a lock can be acquired by accessing the sequence. If, as a result of this, a lock can be acquired, then the lock acquisition operation is achieved by adding one to the sequence elements corresponding to the lock mode, and then releasing the mutex.

Non-Patent Document 1: PostqreSQL 9.0.7 Documentation Chapter 13 Concurrency Control [online]; [retrieved May 11, 2000]; Internet <URL: http//www.postgresql.org/docs/9.0/static/explicit-locking-html>

Non-Patent Document 2: Intel® 64 and IA-32 Architectures Software Developer's Manual Volume 2A [online]; [retrieved May 11, 2000]; Internet <URL: http://www.intel-.com/Assets/PDF/manual/253666.pdf>

SUMMARY

However, in a locking method of this kind, there is a possibility that mutex conflicts will become a problem. This problem is particularly marked in cases where the majority of lock requests are non-conflicting lock modes, and where there is a high request frequency. Regardless of the fact that conflict does not occur with the locks, conflict does occur with the mutex due to the high frequency of lock requests, and therefore acquisition of the mutex may produce a bottleneck.

In other words, in cases where, in all of the lock modes specified by the locks, the number of threads that have acquired locks in the modes cannot be expressed by one word which can be handled by an indivisible access command of the processor, and particularly in cases where the majority of the lock requests are in non-conflicting lock modes, and the frequency of the requests is high, there is a possibility of a bottleneck of conflicts in the exclusive control for protecting the group of variables which hold the lock statuses.

The various aspects of the present invention were devised in view of the problems described above, one object thereof being to provide a lock management system, a lock management method and a lock management program whereby lock acquisition and release processes can be carried out at high speed, even in cases where, in all of the specified lock modes, the number of threads that have acquired locks in the modes cannot be expressed by one word which can be handled by an indivisible access command of a processor.

The lock management system of the present invention is a lock management system having a multi-processor, comprising: lock acquisition means for carrying out a lock acquisition process for a thread according to one or more lock modes, at least a portion of the lock modes being a shared lock that can be acquired by one or more threads; and management means for managing the number of threads acquiring a lock, by first information which can express the number of threads by one word that can be handled by an indivisible access command of the multi-processor, and second information representing a whole range of the number of threads that can possibly acquire a lock in each lock mode.

The lock management method according to the present invention is a lock management method for a lock management system having a multi-processor, the method comprising the steps of: carrying out a lock acquisition process for a thread according to one or more lock modes, at least a portion of the lock modes being a shared lock that can be acquired by one or more threads; and managing the number of threads acquiring a lock, by first information which can express the number of threads by one word that can be handled by an indivisible access command of the multi-processor, and second information representing a whole range of the number of threads that can possibly acquire a lock in each lock mode.

The lock management program according to the present invention causes a lock management system having a multi-processor to execute the steps of: carrying out a lock acquisition process for a thread according to one or more lock modes, at least a portion of the lock modes being a shared lock that can be acquired by one or more threads; and managing the number of threads acquiring a lock, by first information which can express the number of threads by one word that can be handled by an indivisible access command of the multi-processor, and second information representing a whole range of the number of threads that can possibly acquire a lock in each lock mode.

In the present invention, a "unit", "device" or "apparatus" does not simply mean physical means, but also includes cases where the functions of the "unit", "device" or "apparatus" are achieved by software. Furthermore, the functions of one "unit", "device" or "apparatus" may be achieved by two or more physical means or apparatuses, and the functions of two or more "units", "devices" or "apparatuses" may be achieved by one physical means or apparatus.

According to the present invention, it is possible to provide a lock management system, a lock management method and a lock management program whereby lock acquisition and release processes can be carried out at high speed, even in cases where, in all of the specified lock modes, the number of threads that have acquired locks in the modes cannot be expressed by one word which can be handled by an indivisible access command of a processor.

DETAILED DESCRIPTION

Embodiments of the present invention are described below. In the following description and the illustrations of the referenced drawings, parts of the composition which are the same or similar are respectively labelled with the same or similar reference symbols.

1 First Embodiment

Below, the lock management system, lock management method and lock management program according to the present embodiment are described, supposing that a lock acquisition request in a locking method is carried out in any one of the lock modes 0 to n.

1.1 Functional Composition

Figure 1:
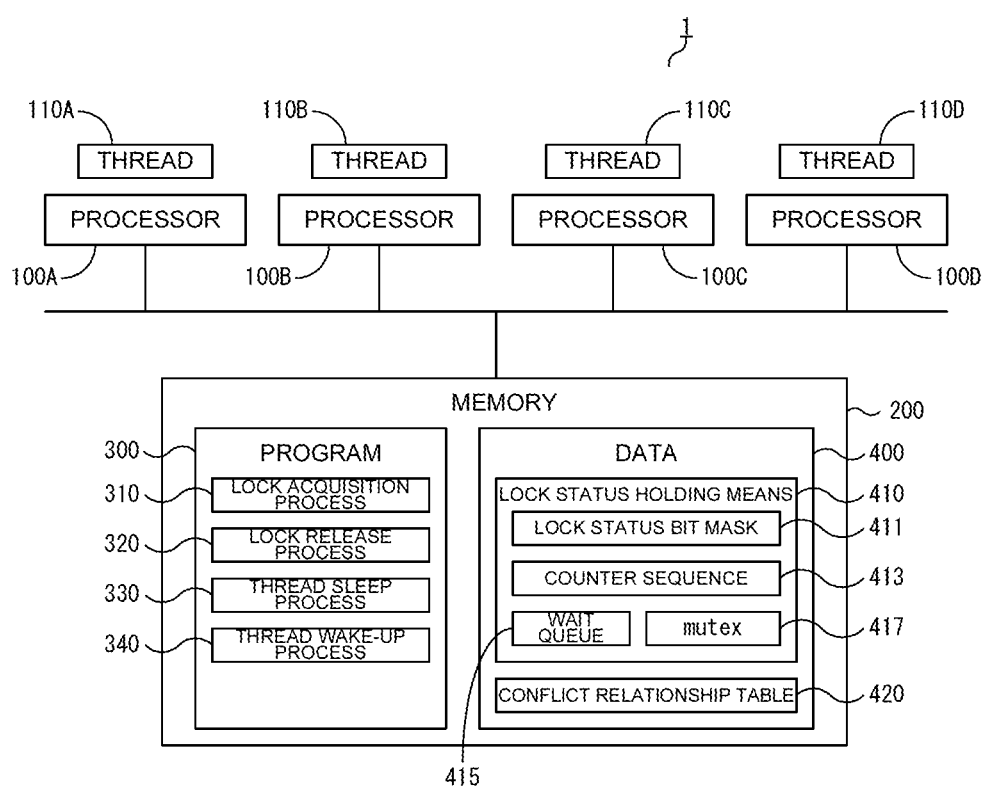
FIG. 1 is a functional block diagram showing a schematic view of a lock management system relating to a first embodiment.

FIG. 1 shows a functional composition of a lock mode system 1 which executes a thread relating to the present embodiment. The lock mode system 1 includes a plurality of processors 100A to 100D executing threads (the processors 100A to 100D are referred to generally as the processor(s) 100 below), and a memory 200.

The memory 200 stores a program 300 which is executed by a thread, and data 400 which is used when a thread executes the program. The program 300 includes a lock acquisition process 310, a lock release process 320, a thread sleep process 330 and a thread wake-up process 340. The data 400 includes lock status holding means 410 containing a lock status bit mask 411, a counter sequence 413, a wait queue 415, and a mutex 417, and a conflict relationship table 420 indicating the conflict relationships of the lock modes.

Figure 2:
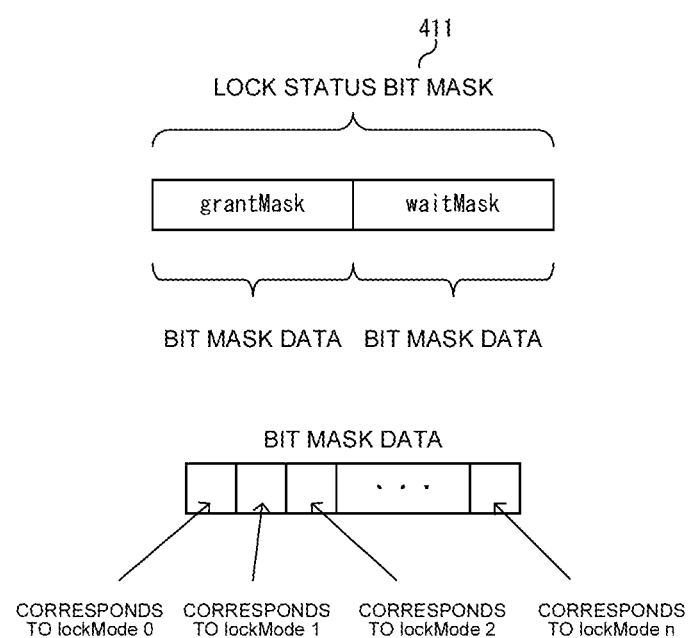
FIG. 2 is a diagram showing a structure of bit mask data and a lock status bit mask which is used in the first embodiment.

The lock status bit mask 411 is now described with reference to FIG. 2. The lock status bit mask 411 is composed by two bit mask data, which are "grantMask" and "waitMask". Here, the bit mask data is a group from bits 0 to n which correspond to the lock modes 0 to n.

grantMask represents the presence and absence of a thread which has acquired the respective lock modes, by bits 0 to n, and waitMask represents the presence and absence of a thread which is waiting to become able to acquire the respective lock modes, by bits 0 to n. In the present embodiment, the number of bits assigned to each lock mode in grantMask is one bit, and therefore the maximum value which can be expressed by one word that can be handled by an indivisible access command of the processor is 1. In the following description, a constant in the bit mask data in which only the bit m is set is written as bit(m), and a constant in which the bit preceding bit(m) is inverted is written as —bit(m).

Figure 3:
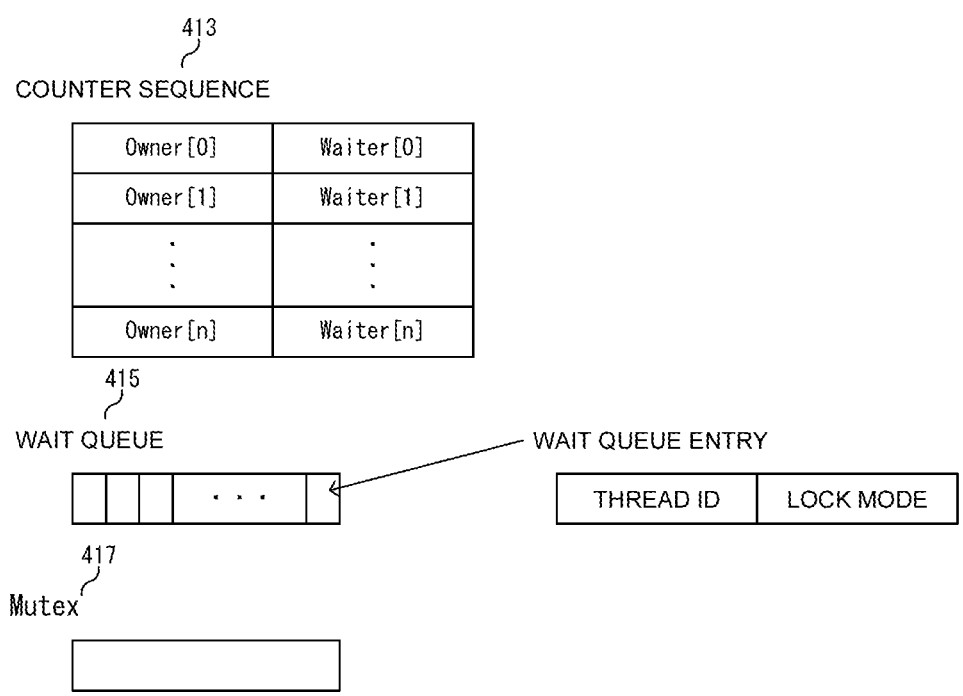
FIG. 3 is a diagram showing a structure of a counter sequence, a wait sequence, a wait sequence entry and a mutex which is used in the first embodiment.

Referring to FIG. 3, the counter sequence 413 is a sequence of variables which hold an Owner value and a Waiter value, corresponding to lock modes 0 to n. The elements of the wait queue 415 are wait queue entries which record a thread ID and a lock mode. Furthermore, the mutex 417 is data for achieving the simplest exclusive control, which can be executed by one thread only.

Of these data, the lock status bit mask 411 and one element (the Owner or Waiter variable) of the counter sequence 413 can be handled by an indivisible access operation provided in the processor 100.

Furthermore, the conflict relationship table 420 is a read-only sequence of bit mask data in which the number of elements is the number of lock modes. Conflict relationships are set in advance in the conflict relationship table 420. Below, the conflict relationship table is written as "conflict", and the bit mask data corresponding to the lock mode n is written as "conflict[n]".

Figure 4:
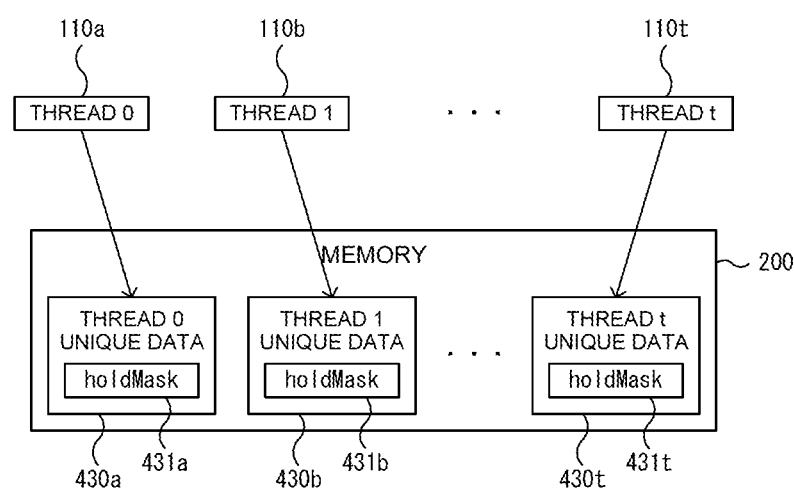
FIG. 4 is a diagram showing a relationship between threads and thread unique data relating to the first embodiment.

FIG. 4 indicates unique data in the memory 200 which is referenced by a thread 110 executed by the processor 100. Referring to FIG. 4, there are thread unique regions (thread unique data 430a to 430t) corresponding to the respective threads 110 (the threads 110a to 100t and the threads 110A to 110D are referred to generally as threads 110) in the memory 200. Furthermore, the thread unique regions (thread unique data 430a to 430t) each include hold Mask, which is bit mask data.

1.2 Flow of Processing

Next, the flow of processing in the lock management system 1 relating to the present embodiment will be described by referring to FIG. 5 to FIG. 21.

(1.2.1 CAS Operation)

Figure 5:
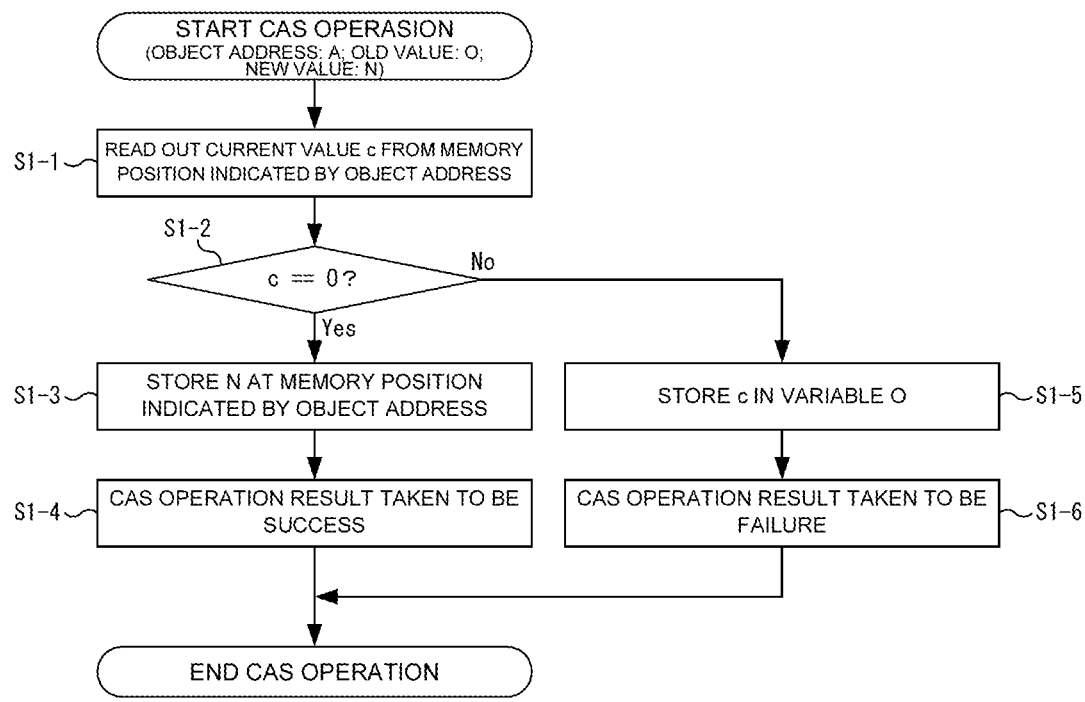
FIG. 5 is a diagram showing a flow of processing of a CAS operation in the lock management system shown in FIG. 1.
Figure 6:
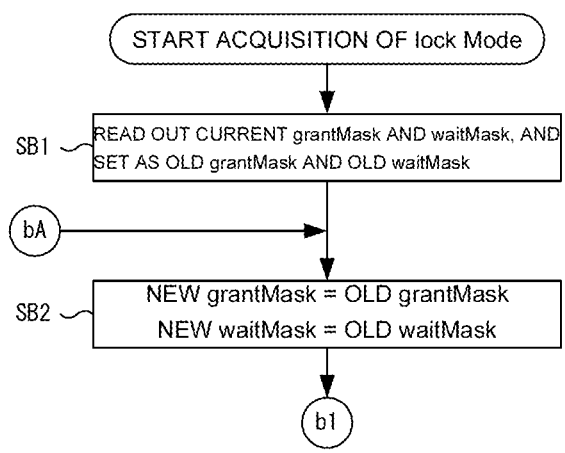
FIG. 6 is a diagram showing a flow of a lock acquisition process in the lock management system shown in FIG. 1.
Figure 7:
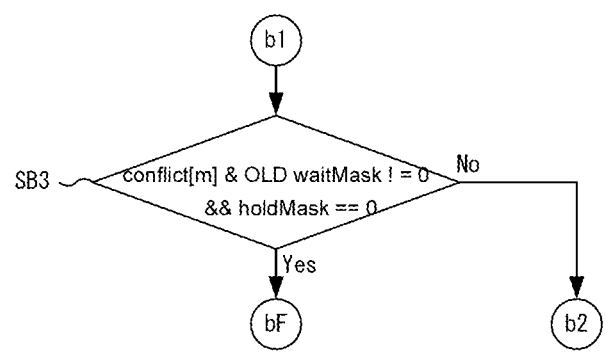
FIG. 7 is a diagram showing a flow of a lock acquisition process in the lock management system shown in FIG. 1.

Firstly, the flow of processing in a CAS operation according to the present embodiment will be described with reference to FIG. 5. The parameters of the CAS operation are an object address (A), an old value (O) and a new value (N). This operation firstly reads out the current value (called c) from the memory position indicated by the object address (S1-1), and then compares this value with the old value (O) (S1-2). If, as a result of this comparison, the two values are equal, then a new value (N) is stored at the memory position indicated by the object address (S1-3), whereupon the result of the CAS operation is taken to be a success (S1-4) and the CAS operation is terminated. On the other hand, if as a result of the comparison in S1-2, the two values are not equal, then the value c is stored in variable O (S1-5), whereupon the CAS operation result is taken to be a failure (S1-6) and the CAS operation is terminated.

The thread sleep process is a process for putting the thread which has read out this process to sleep. The thread wake-up process is a process for waking up a thread that is identified by a thread ID given as a parameter. To simplify the description, it is supposed that if a thread wake-up process is called first, and then the wake-up object thread executes a thread sleep process, that thread will continue execution without being put to sleep. The sleep process or wake-up process can be achieved by giving each thread a semaphore, which is conventional technology.

(1.2.2 Lock Acquisition Process)

Next, a lock acquisition process according to the present embodiment (lock acquisition process 310) will be described with reference to the flowchart from FIG. 6 to FIG. 14. Here, the variables which are used only in this lock acquisition process are: an old lock status bit mask value comprising the old grantMask and the old waitMask; a new lock status bit mask value comprising a new grantMask and a new waitMask; needCAS which is a flag indicating whether or not a CAS operation is necessary; and lockResult which indicates a lock acquisition result.

When a particular thread starts up a process for acquiring a lock in lock mode m, the thread reads out the current lock status bit mask value consisting of grantMask and waitMask, and sets this value in the old lock status bit mask variable (SB1). Thereupon, the thread sets the lock status bit mask in the new lock status bit mask variable (SB2).

Thereupon, it is investigated whether or not the logical sum of conflict[m] and the old waitMask is not 0, and the holdMask value of thread in question is 0 (SB3). The initial condition is established, in other words, the logical sum is a value other than 0, in cases where a lock which conflicts with the lock mode that the thread is seeking to acquire is in a waiting state. If this condition is established, then the thread cannot acquire the lock, and therefore advances to processing for cases where the lock cannot be acquired (label bF). Furthermore, if the condition SB3 is not established, then the thread advances to processing for acquiring a lock (label b2).

Figure 8:
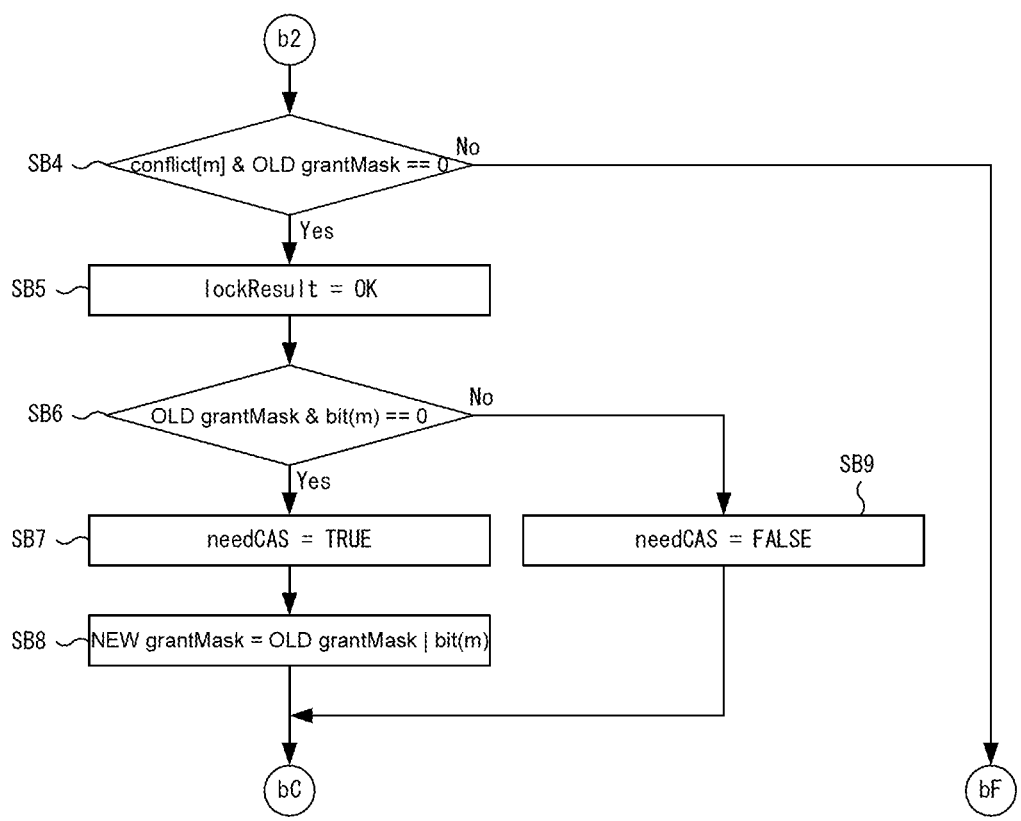
FIG. 8 is a diagram showing a flow of a lock acquisition process in the lock management system shown in FIG. 1.

In the process for acquiring a lock (label b2; FIG. 8), firstly, it is investigated whether or not the logical sum of conflict[m] and the old grantMask is 0 (SB4). This logical sum is a value other than 0 in cases where a lock which conflicts with the lock mode that the thread is seeking to acquire has already been acquired. Therefore, if the logical sum is not 0, the thread advances to processing for cases where a lock cannot be acquired (label bF). On the other hand, if the logical sum is 0, then a value indicating OK is input to the local parameter storing the lock result, (lockResult) (SB5), and it is investigated whether or not bit(m) of the old grantMask has been set (SB6). In a state where bit(m) of the old grantMask has not been set, there is no thread which has acquired a lock in that lock mode, and therefore a value indicating TRUE is input to the local variable needCAS, which stores information indicating whether or not a lock status bit mask operation is necessary (SB7), in addition to which the value set in bit(m) of the old grantMask is taken as the new grantMask for use in the CAS operation (SB8), and the thread then advances to a process for operating the bit mask (label bC).

On the other hand, a state where the bit(m) of the old grantMask has been set in SB4 is a state where there is another thread which has acquired a lock in that lock mode, and therefore a value indicating FALSE is input to needCAS (SB9), whereupon the thread advances to a process for operating the bit mask (label bC).

Figure 9:
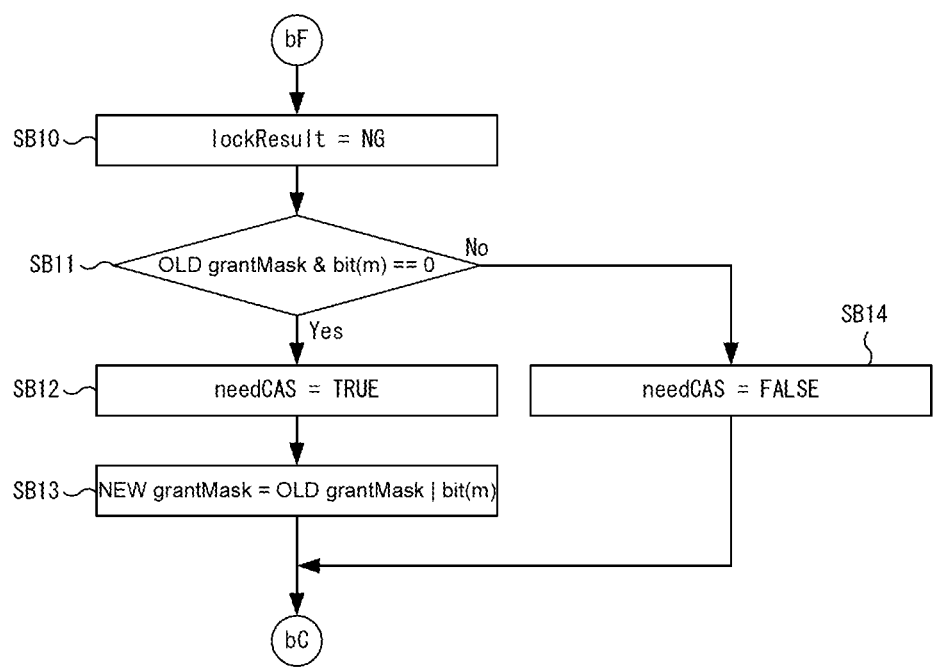
FIG. 9 is a diagram showing a flow of a lock acquisition process in the lock management system shown in FIG. 1.

In the processing for cases where a lock cannot be acquired (label bF; FIG. 9), firstly, the thread inputs a value indicating a failure to the lockResult (SB10) and then investigates whether or not the bit(m) of the old waitMask has been set (SB11). In a state where bit(m) of the old grantMask has not been set, there is no sleeping thread which is seeking to acquire a lock in that lock mode, and therefore a value indicating TRUE is input to needCAS (SB12), in addition to which the value set in bit(m) of the old waitMask is taken as the new waitMask for use in the CAS operation (SB13), and the thread then advances to a process for operating the bit mask (label bC).

On the other hand, a state where bit(m) of the old waitMask has been set in SB11 is a state where another thread is seeking to acquire a lock in that lock mode and has been put to sleep, and therefore a value indicating FALSE is input to needCAS (SB14), and the thread then advances to a process for operating the bit mask (label bC).

Figure 10:
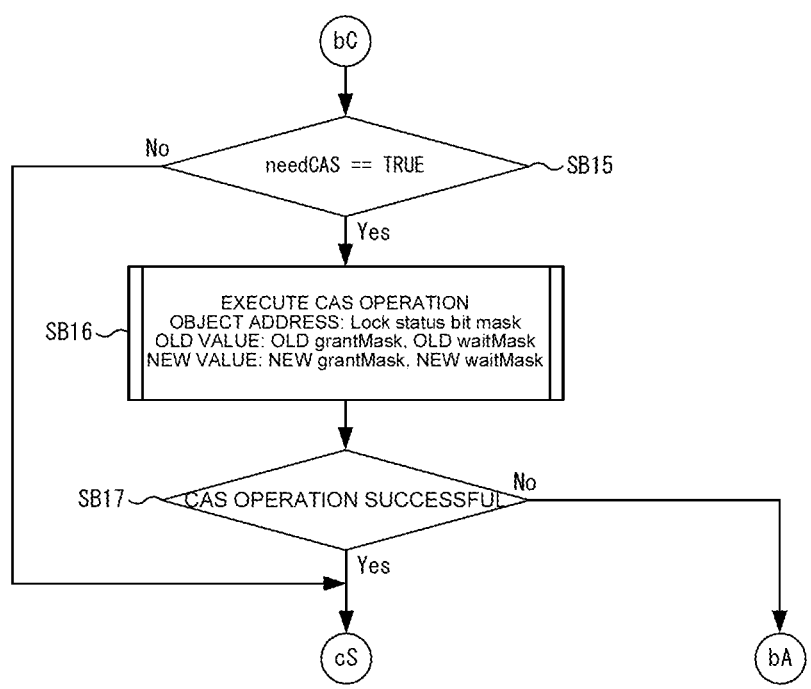
FIG. 10 is a diagram showing a flow of a lock acquisition process in the lock management system shown in FIG. 1.
Figure 11:
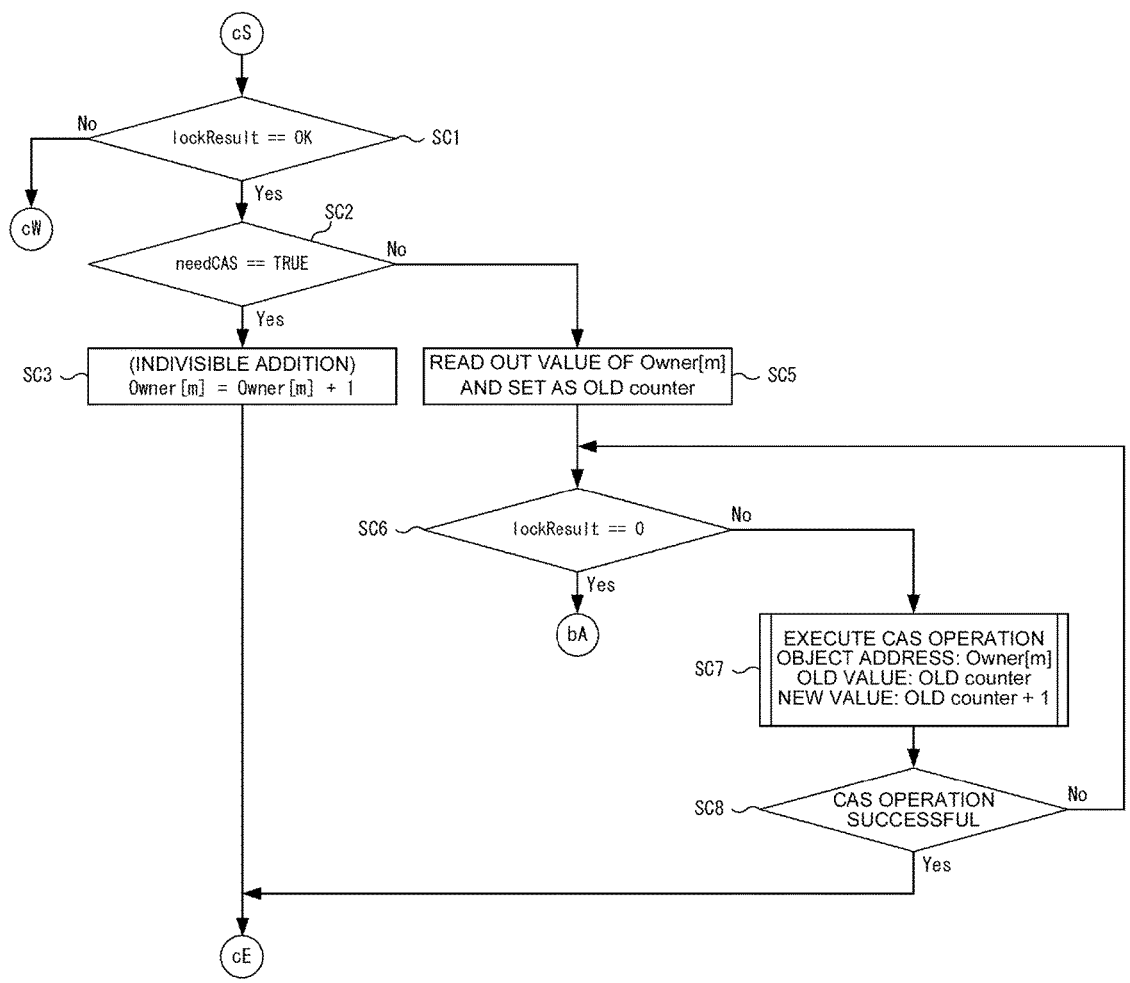
FIG. 11 is a diagram showing a flow of a lock acquisition process in the lock management system shown in FIG. 1.
Figure 12:
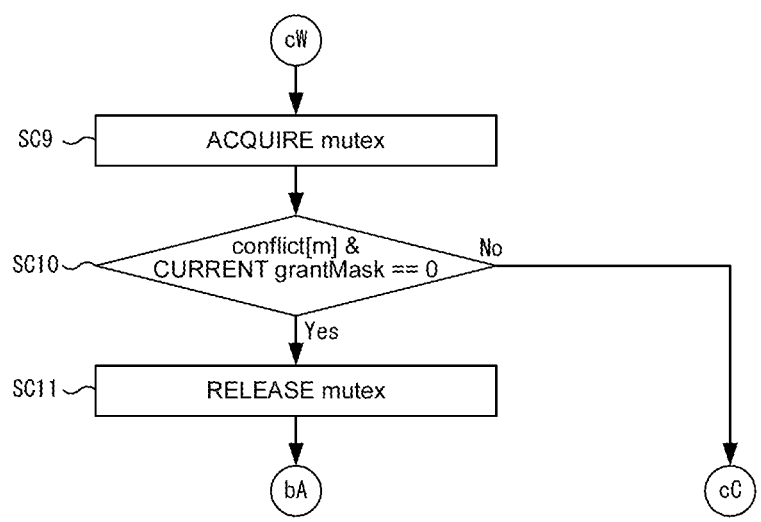
FIG. 12 is a diagram showing a flow of a lock acquisition process in the lock management system shown in FIG. 1.
Figure 13:
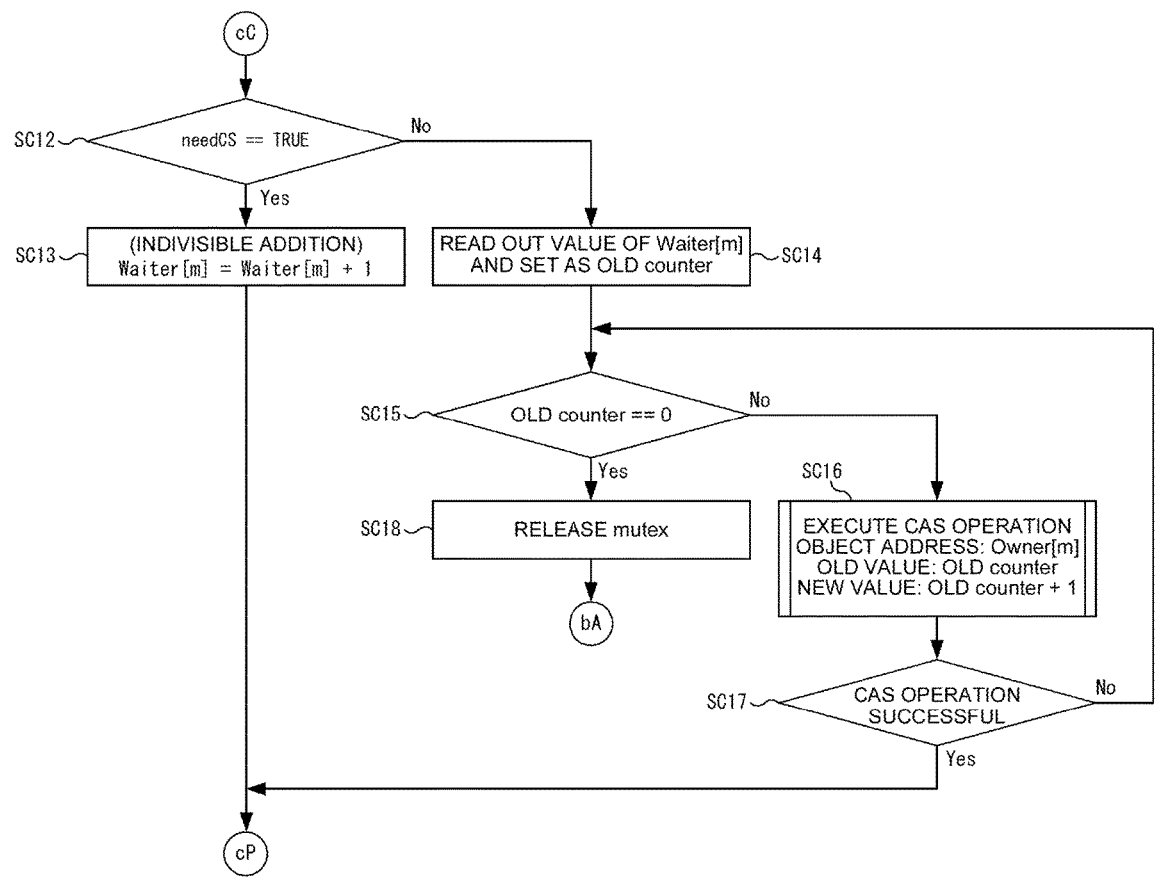
FIG. 13 is a diagram showing a flow of a lock acquisition process in the lock management system shown in FIG. 1.
Figure 14:
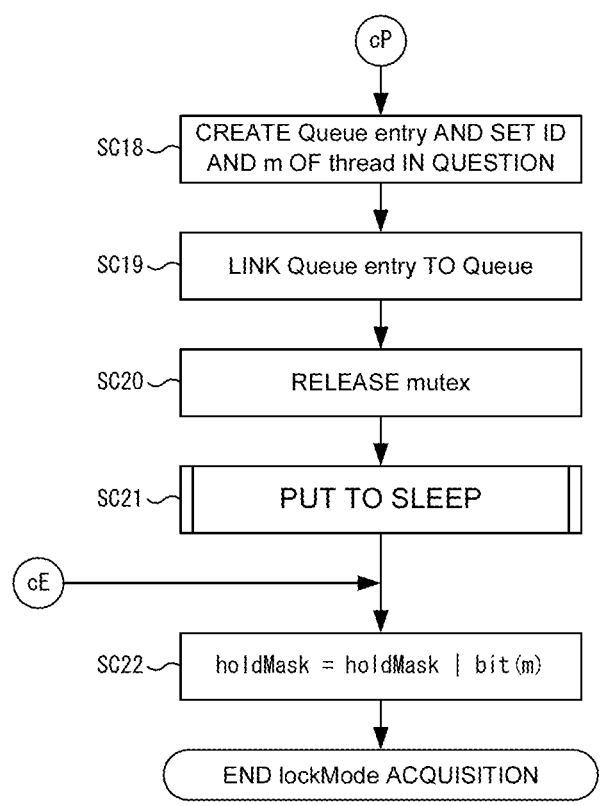
FIG. 14 is a diagram showing a flow of a lock acquisition process in the lock management system shown in FIG. 1.
Figure 15:
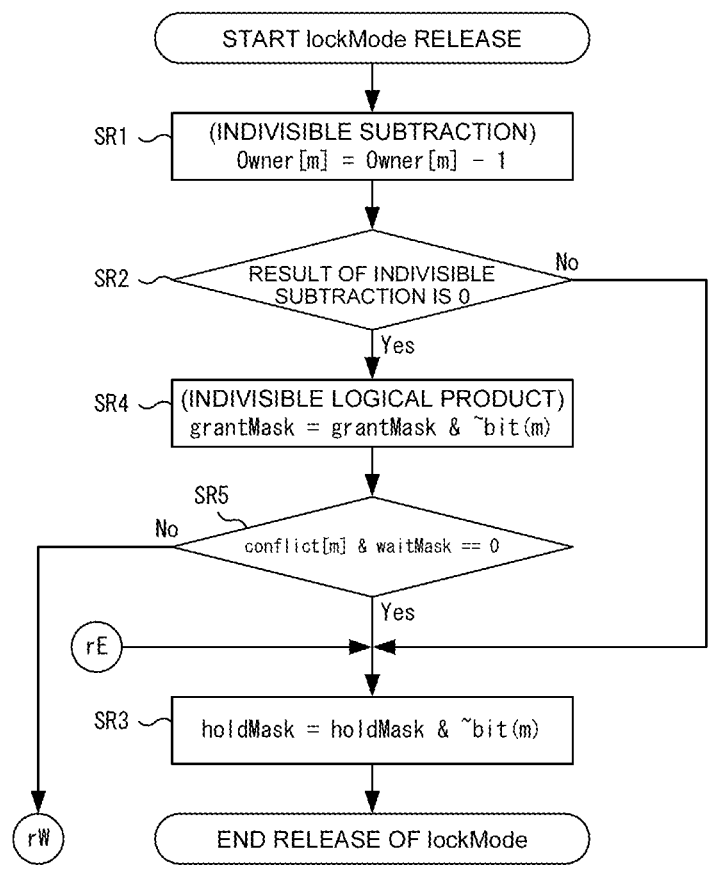
FIG. 15 is a diagram showing a flow of a lock release process in the lock management system shown in FIG. 1.

In the process for operating the bit mask (label bC; FIG. 10), firstly, the value of needCAS is investigated (SB15). If, as a result of this, needCAS is FALSE (No at SB15), then the thread advances to a process for operating the counter sequence (label bS). On the other hand, if the value of needCAS is TRUE (Yes at SB15), then a CAS operation is executed in which the object address is set as the address of the lock status bit mask, the old values are set as the old bit mask values, in other words, the values of the old grantMask and the old waitMask, and the new values are set as the new bit mask values, in other words, the values of the new grantMask and the new waitMask (SB16). If the values of the new grantMask and the new waitMask have not been set in the processing steps executed thus far, then the old Mask values set in step B2 will be remaining. It is determined whether or not this CAS operation has been successful (SB17), and if the CAS operation has failed (No at SB17), then the thread returns to SB2 and carries out the series of processes again (label bA). Furthermore, if the CAS operation is successful (Yes at SB17), then the thread advances to a process for operating the counter sequence (label cS).

In the process for operating the counter sequence (label cS, FIG. 11), firstly, the value of lockResult is investigated (SC1). If, as a result of this, lockResult is not OK (if lockResult is a failure; No at SC1), then the thread advances to processing for operating Waiter (label cW), in the counter sequence. If, on the other hand, lockResult is OK (Yes at SC1), then the value of needCAS is investigated (SC2). If, as a result of this, needCAS is TRUE (Yes at SC2), then Owner[m] in the counter sequence is incremented by 1, by an indivisible addition, and the thread advances to label cE. If, on the other hand, needCAS is FALSE, then the thread reads out the value of Owner[m], sets this value as the old counter, which is a local variable for the CAS operation (SC5), and then investigates whether or not the old counter value is 0 (SC6). If the old counter value is 0 (Yes at SC6), then the thread returns to SB2 and carries out the series of processes again (label bA). On the other hand, if the old counter value is not 0 (No at SC6), then the thread executes a CAS operation, by setting the address in Owner[m] as the object address, setting the old counter value as the old value, and setting the old counter value+1 as the new value (SC7). Next, it is investigated whether or not the CAS operation has been successful (SC8). If the CAS operation has failed (No at SC8), then the thread returns to SC6. If the CAS operation has been successful (Yes at SC8), then the procedure advances to label cE.

In the process for operating Waiter, in the counter sequence, firstly, mutex is acquired (SC9), and it is investigated whether or not the logical sum of conflict[m] and grantMask is 0 (SC10). If this logical sum is 0 (Yes in SC10), then this means that a lock conflicting with the lock mode that the thread is seeking to acquire has not been acquired, and it is possible to acquire a lock in the lock mode that the thread is requesting, and therefore the thread releases the mutex (SC11), returns to SB2 and carries out the series of processes again. This processing flow is generated when another thread which has acquired a conflicting lock releases the lock after the logical sum of conflict[m] and grantMask is investigated in SB4 and before this same logical sum is investigated in SC10.

On the other hand, if the logical sum investigated in SC10 is not 0 (No at SC10, label cC), then the value of needCAS is investigated (SC12). As a result of this, if needCAS is TRUE (Yes in SC12), then after incrementing Waiter[m] of the counter sequence by 1 by an indivisible addition (SC13), the thread advances to processing for connecting the thread in question to the wait queue (label cP). If, on the other hand, needCAS is FALSE in SC12 (No at SC12), then the thread reads out the value of Waiter[m], sets this value as the old counter, which is a local variable for the CAS operation (SC14), and then investigates whether or not the old counter value is 0 (SC15). If the old counter value is 0 (Yes at SC15), then the thread releases mutex (SC18), returns to SB2 and carries out the series of processing again (label bA). On the other hand, if the old counter value is not 0 (No at SC15), then the thread executes a CAS operation, by setting the address in Waiter[m] as the object address, setting the old counter value as the old value, and setting the old counter value*1 as the new value (SC16). If, as a result of this, the CAS operation fails (No at SC17), then the processing is carried out again from SC15. If the CAS operation is successful (Yes at SC17), then the thread advances to a process for linking the thread in question to the wait queue (label cP).

In the processing for linking the thread in question to the wait queue (label cP, FIG. 14), firstly, a wait queue entry is created and then the ID assigned to the thread in question, and the requested lock mode (m), are set (SC18). Next, the created wait queue entry is linked to the wait queue (SC19), the mutex is released (SC20), and then the thread is put to sleep by the thread sleep process (SC21). When the sleeping thread is awakened, the bit(m) of the holdMask of the thread in question is set (SC22), and the lock acquisition operation for the lock mode m is terminated.

(1.2.3 Lock Mode Release Process)

Next, the lock release process in the present embodiment will be described with reference to FIG. 15 to FIG. 21. The local variables which are used only in this process are used when awakening a thread which has been put to sleep and is awaiting lock release, these variables being: the old lock status bit mask consisting of the old grantMask and the old waitMask; the new lock status bit mask values consisting of the new grantMask and the new waitMask; needCAS which is a flag indicating whether or not a CAS operation is necessary; a pointer indicating a wait queue entry that is the operation object in the wait queue; a variable w that holds the lock mode held by the wait queue entry that is the operation object; a wake-up object list that holds the wake-up object thread; and a bit mask type variable (PrecedMask) for holding the logical sum of the lock modes of all of the wait queue entries linked to the wake-up object list. The wake-up object list is data having the same structure as the wait queue, which holds a plurality of wait queue entries.

When the thread which has acquired a lock in the lock mode m starts up a process of releasing the lock, the thread decrements Owner [m] by 1, in other words, adds−1 thereto, by an indivisible addition (SR1), and then investigates the result of this indivisible addition (SR2). If the result is not 0 (No at SR2), then another thread has acquired a lock in that lock mode, and therefore the bit(m) of hold Mask of the thread in question is reset (SR3), and the operation of releasing the lock is terminated. On the other hand, if the result of the indivisible addition is 0 (Yes at SR2), then bit(m) of grantMask is reset by an indivisible logical product (SR4), and the logical product of conflict[m] and waitMask is investigated (SR5). This result is 0 (Yes at SR5) in cases where there is no thread waiting for the release of the lock mode m, and therefore the thread advances to SR3, resets bit(m) of holdMask of the thread in question, and terminates the operation of releasing the lock.

On the other hand, in SR5, if the logical product of conflict[m] and waitMask is not 0, then that means there is a thread waiting for the release of the lock mode m, and therefore processing for waking up the thread that is in a waiting state is carried out (label rW).

Figure 16:
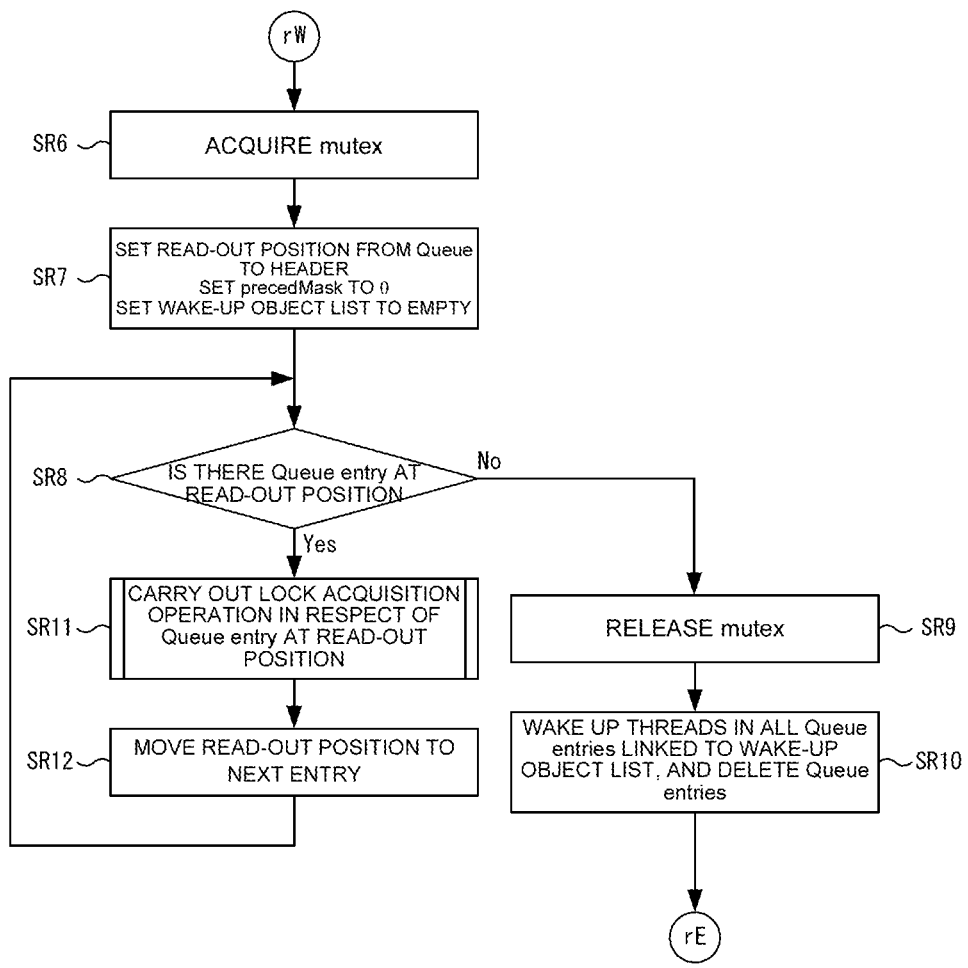
FIG. 16 is a diagram showing a flow of a lock release process in the lock management system shown in FIG. 1.
Figure 17:
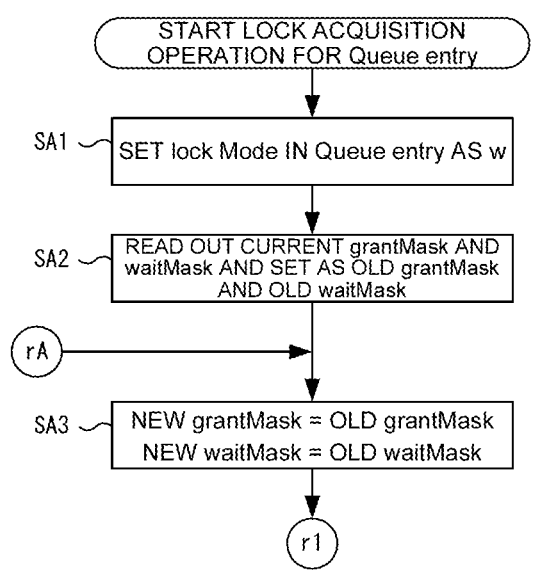
FIG. 17 is a diagram showing a flow of a lock release process in the lock management system shown in FIG. 1.
Figure 18:
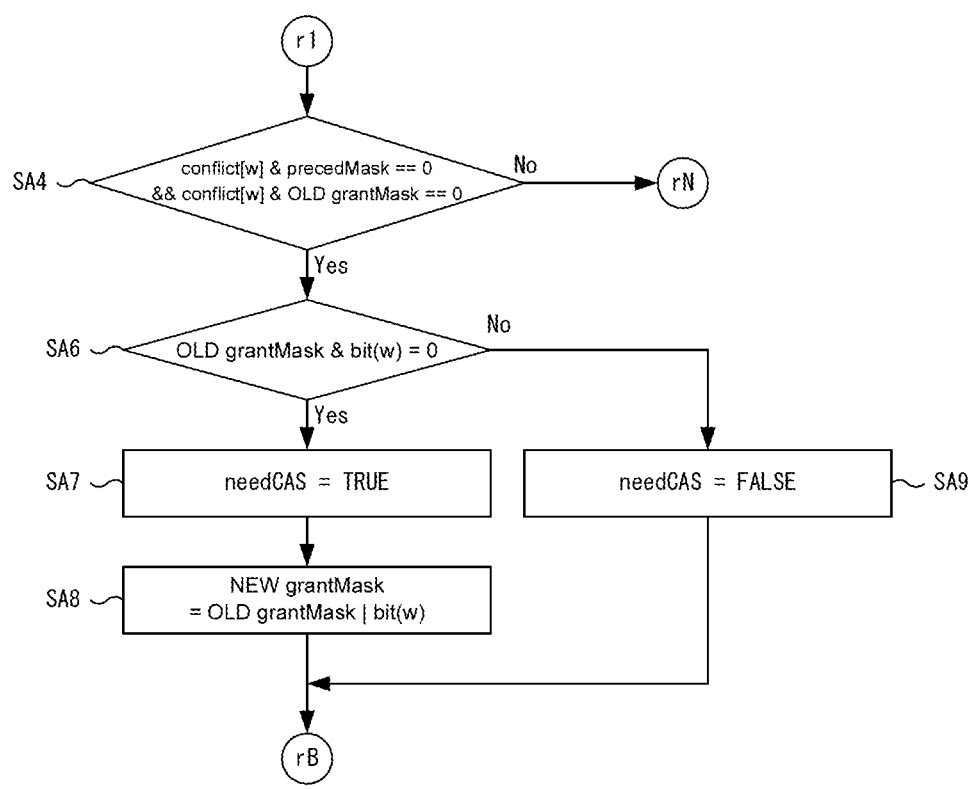
FIG. 18 is a diagram showing a flow of a lock release process in the lock management system shown in FIG. 1.

In the process of waking up the thread that is in a waiting state (label rW; FIG. 16), firstly, a mutex is acquired (SR6), the read-out position from the wait queue is reset to the leading entry of the wait queue, precedMask is reset to 0, and the wake-up object list is reset to empty (SR7), and then it is investigated whether or not a lock in the lock mode w requested by the thread corresponding to the wait queue entry can be acquired, in respect of all of the entries linked to the wait queue, and if a lock can be acquired, the lock status is changed and then the thread is woken up. More specifically, firstly, it is investigated whether or not there is an entry at the read-out position (SR8), and if, as a result of this, there is no entry at the read-out position (No at SR8), then this means that processing has finished for all of the entries linked to the wait queue, and hence the mutex is released (SR9), all of the wait queue entries linked to the wake-up object list are woken up, and these wait queue entries are then deleted (SR10), and furthermore, bit(m) of hold Mask of the thread in question is reset (label rE, SR3). The process of releasing the lock then terminates.

On the other hand, if there is an entry at the read-out position in SR8 (Yes at SR8), then a lock acquisition operation is carried out in respect of the wait queue entry at the read-out position (SR11), the read-out position is then moved to the next position of that entry in the wait queue (SR12), and the procedure returns to SR8 and repeats a loop process.

In a lock acquisition operation for a wait queue entry (FIG. 17), firstly, the lock mode recorded in that wait queue entry is set as w (SA1), and the current lock status bit mask value consisting of grantMask and waitMask is read out and set in the old lock status bit mask variable (SA2). Thereupon, the thread sets the old lock status bit mask in the new lock status bit mask variable (SA3).

It is then investigated whether or not the logical product of conflict[w] and precedMask is not 0 and the logical product of conflict[w] and the old grantMask is 0 (SA4). This condition is not established (No at SA4) in cases where a lock cannot be acquired in the lock mode w, and therefore the lock acquisition operation in relation to this wait queue entry is terminated (label rN). On the other hand, if the condition in SA4 is established (Yes at SA4), then it is investigated whether or not bit(w) of the old grantMask has been set (SA6). If bit(w) of the old grantMask has not been set (YES at SA6), then a value indicating TRUE is input to needCAS (SA7), the value set in bit(w) of the old grantMask is taken as the new grantMask to be used in the CAS operation (SA8), and the thread then advances to a process for operating the bit mask (label rB). On the other hand, if the bit(w) of the old grantMask has been set (No at SA6), then a value indicating FALSE is input to needCAS (SA9), and the thread advances to a process for operating the bit mask (label rB).

Figure 19:
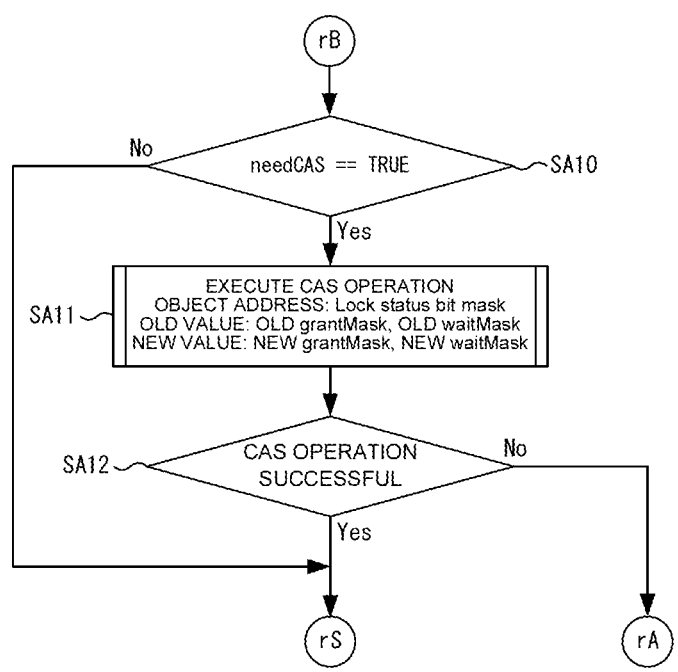
FIG. 19 is a diagram showing a flow of a lock release process in the lock management system shown in FIG. 1.

In the process for operating the bit mask (label rB; FIG. 19), firstly, the value of needCAS is investigated (SA10). If, as a result of this, needCAS is FALSE (No at SA10), then the thread advances to a process for operating the counter sequence (label rS). On the other hand, if the value of needCAS is TRUE (Yes at SA10), then a CAS operation is executed in which the address of the lock status bit mask is set as the object address, the old bit mask values, in other words, the values of the old grantMask and the old waitMask, are set as old values, and the new bit mask values, in other words, the values of the new grantMask and the new waitMask, are set as new values (SA11). If the values of the new grantMask and the new waitMask have not been set in the processing steps executed thus far, then the old Mask value set in step SA2 will be remaining. Next, it is determined whether this CAS operation has been successful (SA12), and if the CAS operation has failed (No at SA12), then the thread returns to SA3 and carries out the series of processes again (label rA). On the other hand, if the CAS operation is successful (Yes at SA12), then the thread advances to a process for operating the counter sequence (label rS).

Figure 20:
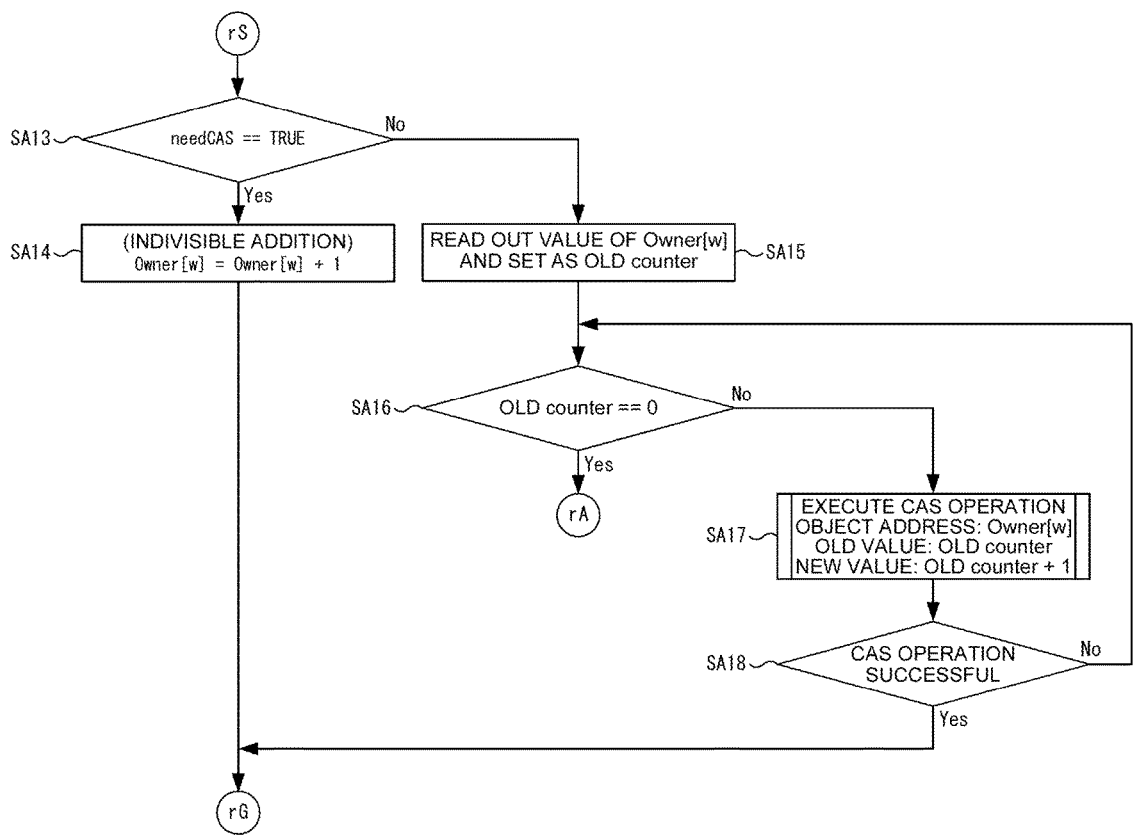
FIG. 20 is a diagram showing a flow of a lock release process in the lock management system shown in FIG. 1.

In the process for operating the counter sequence (label rS; FIG. 20), the value of needCAS is investigated (SA13). If, as a result of this, needCAS is TRUE (Yes at SA13), then Owner[w] in the counter sequence is incremented by 1, by an indivisible addition, and the thread then advances to a thread wake-up preparation operation (label rB). If, on the other hand, needCAS is FALSE (No at SA13), then the thread reads out the value of Owner[w], sets this value as the old counter, which is a local variable for the CAS operation (SA15), and then investigates whether or not the old counter value is 0 (SA16). If the old counter value is 0, then the thread returns to SA3 and carries out the series of processes again (label rA). On the other hand, if the old counter value is not 0 (No at SA16), then the thread executes a CAS operation, by setting the address in Owner[m] as the object address, setting the old counter value as the old value, and setting the old counter value+1 as the new value (SA17). Next, it is investigated whether or not the CAS operation has been successful (SA18). As a result of this, if the CAS operation fails (No at SA18), then the processing is carried out again from SA16. If the CAS operation has been successful (Yes at SA18), then the procedure advances to SA19 (label rG).

Figure 21:
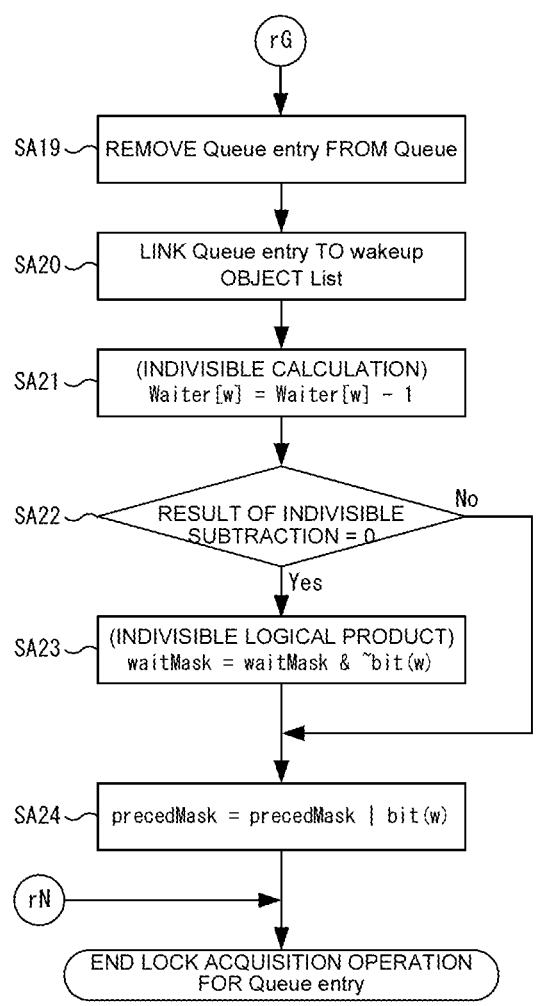
FIG. 21 is a diagram showing a flow of a lock release process in the lock management system shown in FIG. 1.
Figure 22:
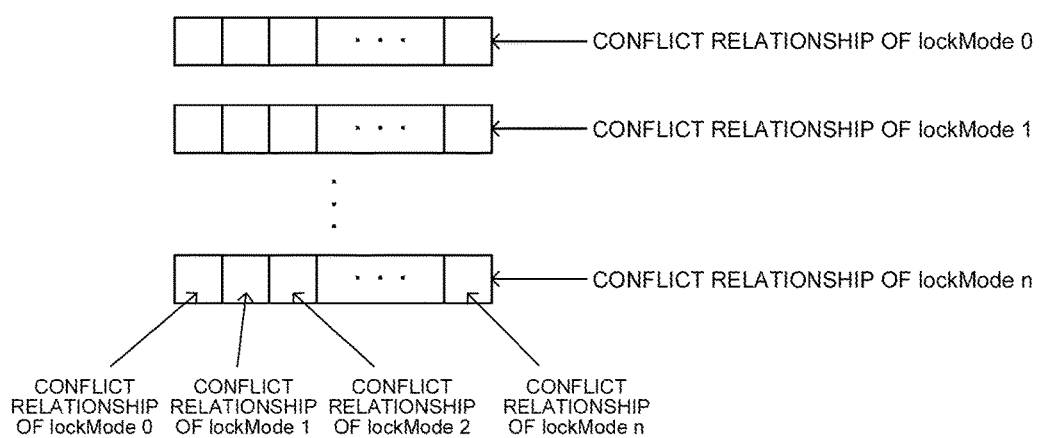
FIG. 22 is a diagram showing a sequence structure of bit mask data for handling a conflict relationship between locks.

In the thread wake-up preparation operation (label rG; FIG. 21), firstly, the operation object wait queue entry is removed from the wait queue (SA19), and is linked to the wake-up object list (SA20). Next, Waiter[w] is decremented by 1, in other words, −1 is added thereto by an indivisible addition (SA21), and the result of the indivisible addition is investigated (SA22). If the result is 0 (Yes at SA22), then bit(w) of waitMask is set (SA24), and the processing in respect of the wait queue entry terminates. On the other hand, if the result of the indivisible addition in SA22 is not 0 (No at SA22), then the thread skips SA23 and advances to SA24.

1.3 Effects of the Present Embodiment

As described above, according to the present embodiment, it is possible to achieve a locking method whereby, even in cases where, in all of the lock modes specified by locks, the number of threads that have acquired locks in the modes cannot be expressed by one word that can be handled by an indivisible access command of the processor, lock requests in non-conflicting lock modes can be processed without using a mutex to protect the group of variables holding the lock status.

In other words, even if, in all of the lock modes specified by the locks, the number of threads that have acquired locks in the modes cannot be expressed by one word which can be handled by an indivisible access command of the processor, and particularly even in cases where the majority of the lock requests are in non-conflicting lock modes, and the frequency of the requests is high, bottlenecks do not occur in the exclusive control for accessing the group of variables which hold the lock status, and the lock acquisition and release processes can be carried out at high-speed.

The reason for this is because, when there is a request for acquisition of a lock that does not conflict with a lock that has already been acquired, the lock acquisition request can be processed by accessing the group of variables holding the lock status, by an indivisible access command or an indivisible calculation command of the processor, following an algorithm that is conceived so as to avoid contradiction with the locking operation. In other words, since exclusive control for accessing the group of variables holding the lock status is not required, then it is possible to carry out a lock acquisition operation without generating a bottleneck due to exclusive control of this kind.

1.4 Additional Items

In the present embodiment, in order to simplify the explanation, a method is described which handles information (Owner [m]) representing the whole range of the values that can be taken by the number of threads acquiring a lock in all of the lock modes, but the invention is not limited to this. For example, it is also possible to omit the handling of Owner[m], by using conventional technology which controls only information handling the range of values which can be expressed by one word that be handled by an indivisible access command of the processor, in respect of a mode in which the number of threads able to acquire the lock is 1 (exclusive lock). In this case, a mode in which a plurality of threads can acquire a lock (shared lock) is managed by using the method described in the present embodiment; in other words, a method which combines conventional technology and the present embodiment is employed.

Moreover, in the present embodiment, a process which can use an indivisible calculation employs an indivisible calculation operation rather than a CAS operation. It is clear that the indivisible calculation operation can be achieved by using a CAS operation, and therefore processes which are carried out by an indivisible calculation operation in the present embodiment may be modified so as to employ a CAS operation instead.

2 Second Embodiment

2.1 Overview

Next, a locking method capable of lock promotion will be described as a lock management system 1 and a lock management method based on a program 300 according to a second embodiment of the invention, with reference to FIG. 23 to FIG. 34. In the explanation given below, the respective descriptions relating to system configurations and actions, effects, and the like, which are common with or similar to the first embodiment are omitted.

Lock promotion means that a thread which has acquired a lock in a particular lock mode acquires a lock in another mode. One characteristic feature thereof is that, even in cases where there is a conflicting relationship between a lock mode that has already been acquired, and a lock mode that the thread is seeking to acquire, if another thread has not acquired a lock mode which is in a conflicting relationship with the lock mode that the thread in question is seeking to acquire, then the lock can be acquired, in other words, the lock in the mode acquired by the thread in question is exempted from conflict determination.

Figure 23:
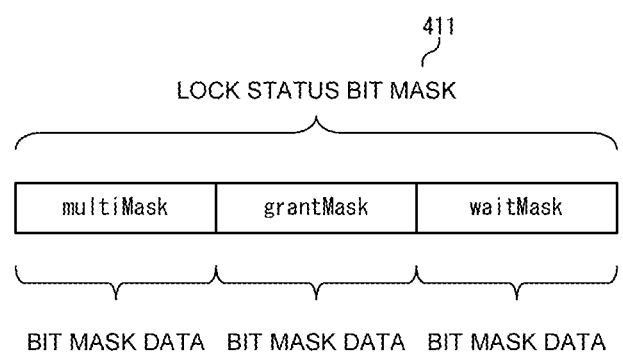
FIG. 23 is a diagram showing a structure of a lock status bit mask which is used in a second embodiment.
Figure 24:
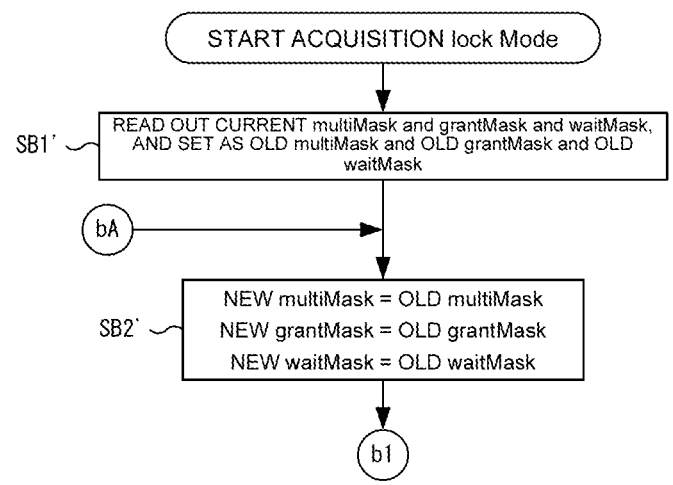
FIG. 24 is a diagram showing a flow of a lock acquisition process in the lock management system relating to the second embodiment.
Figure 25:
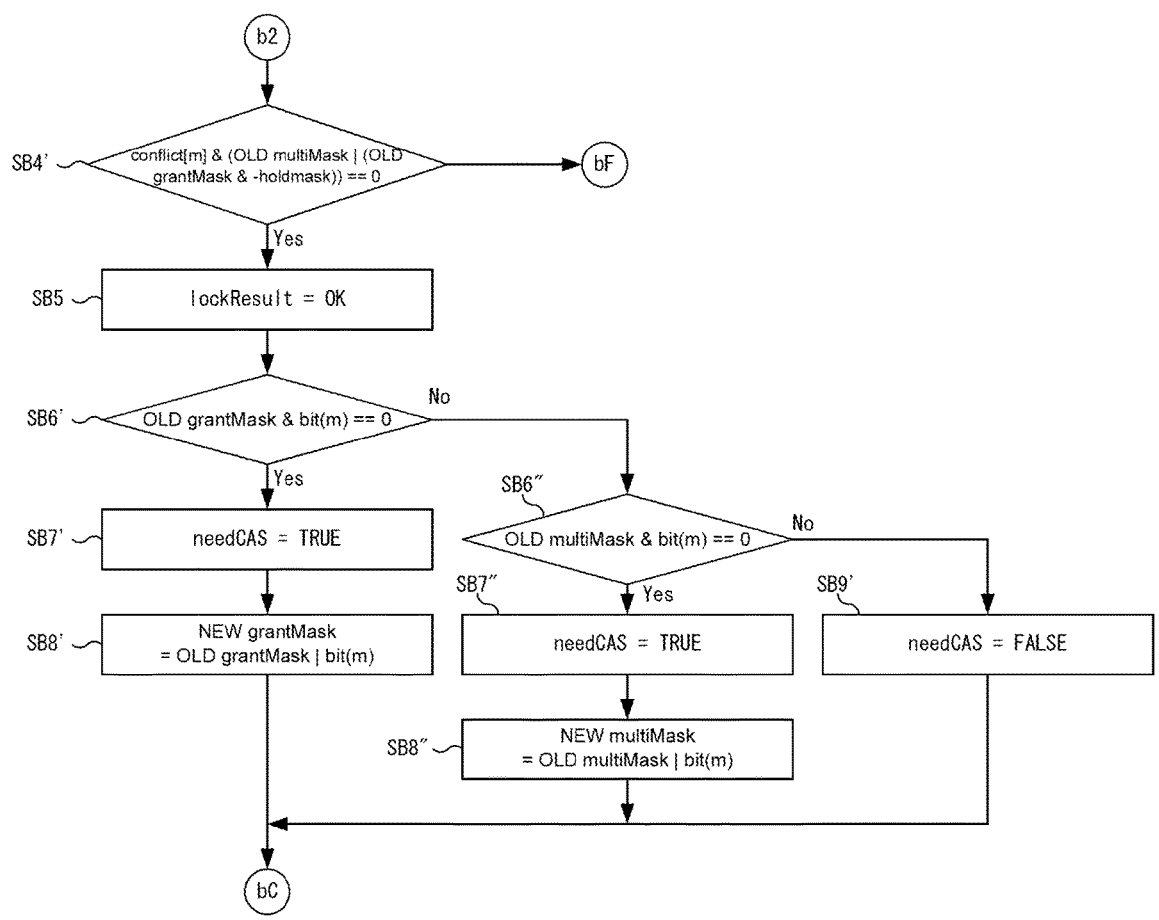
FIG. 25 is a diagram showing a flow of a lock acquisition process in the lock management system relating to the second embodiment.
Figure 26:
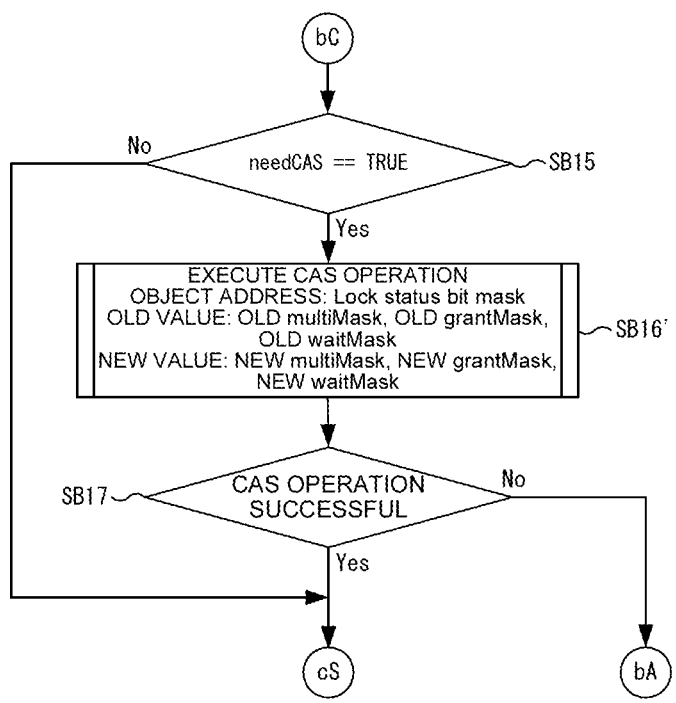
FIG. 26 is a diagram showing a flow of a lock acquisition process in the lock management system relating to the second embodiment.
Figure 27:
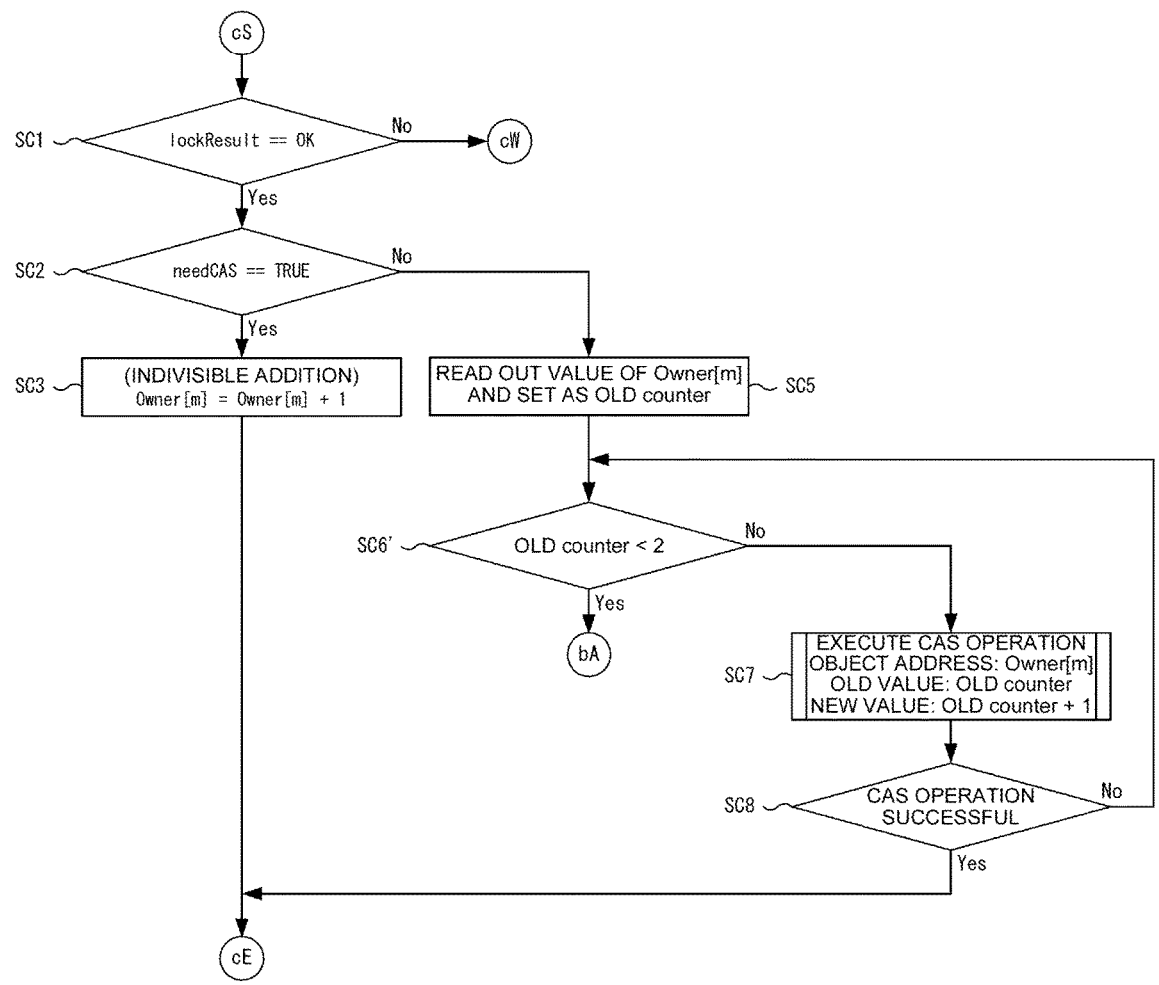
FIG. 27 is a diagram showing a flow of a lock acquisition process in the lock management system relating to the second embodiment.
Figure 28:
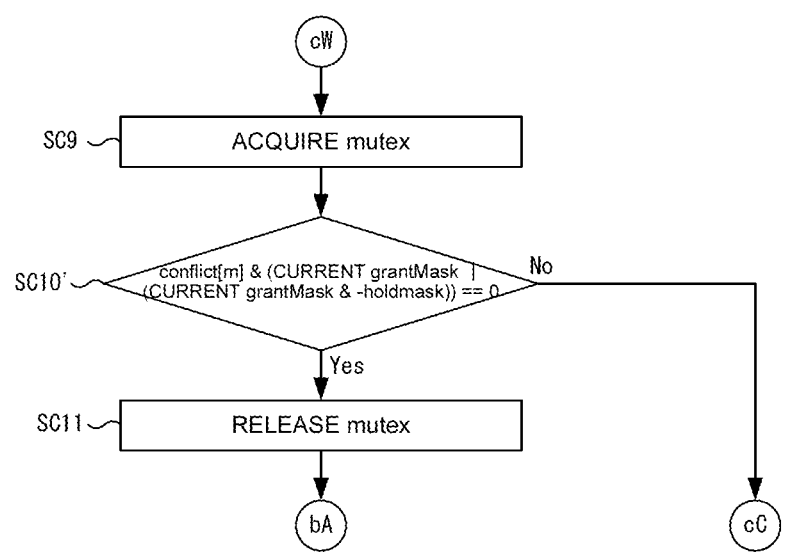
FIG. 28 is a diagram showing a flow of a lock acquisition process in the lock management system relating to the second embodiment.
Figure 29:
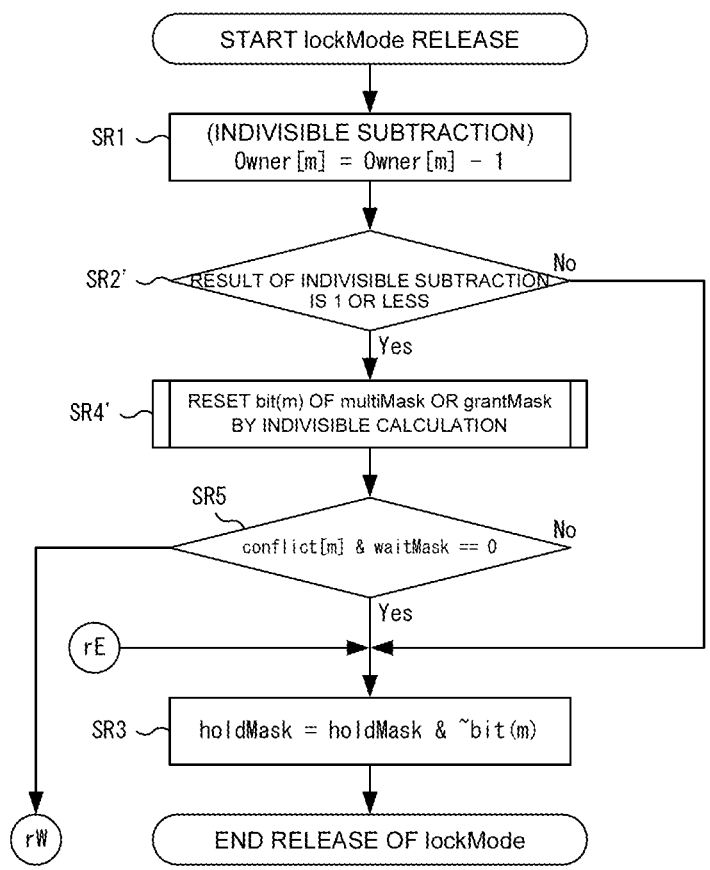
FIG. 29 is a diagram showing a flow of a lock release process in the lock management system relating to the second embodiment.

Referring to FIG. 23, the lock status bit mask 411 in the present embodiment is constituted by bit mask data: multiMask, grantMask and waitMask. This lock status bit mask 411 falls within in one word that can be handled by an indivisible access command of the processor 100. The meanings of grantMask and waitMask are the same as in the first embodiment, and multiMask indicates whether or not there are two or more threads which have acquired respective lock modes. More specifically, if the number of threads which have acquired a lock in a particular lock mode m is two or more, then bit(m) is set in both multiMask and grantMask, and if the number of threads which have acquired a lock in that lock mode is 1, then bit(m) is set in grantMask, but bit(m) is not set in multiMask. In other words, in the locking method relating to the present embodiment, the number of threads holding a lock can be expressed up to a maximum value of 2, by one word which can be handled by an indivisible access command of the processor.

2.2 Flow of Processing

The flow of processing relating to the present embodiment is now described with reference to FIG. 24 to FIG. 34. Here, a large portion of the processing is similar to that of the first embodiment, and therefore the description given below centers on the different portions.

Firstly, by adding multiMask to the lock status bit mask, SB1, SB2, SB16, SA2, SA3 and SA11 are modified in such a manner that operations similar to grantMask and waitMask are also carried out in respect of multiMask (the steps are indicated respectively as SB1', SB2', SB16', SA2', SA3' and SA11' in the drawings).

Furthermore, in determining whether or not a lock can be acquired, a condition is also added to exempt from consideration a lock mode that has already been acquired by the thread in question. More specifically, in SB4, the value used to find a logical product with conflict[m] is changed from grantMask, to the logical sum of multiMask, and the logical product of grantMask and the inverse values of all of the bits holdMask (SB4'). By acquiring the logical sum of grant Mask and the inverse values of the preceding bits of hold Mask, it is possible to set the bit in grantMask corresponding to the mode acquired by the thread in question, to 0, thereby excluding it from the conflict determination conditions. If bit(m) of multiMask has been set, then this indicates that at least one other thread has acquired a lock in the lock mode m, and therefore the logical product with conflict[m] is found without conditions in SB4'.

A similar modification, in other words, a modification for changing the value used to find a logical product with conflict[m], from grantMask, to the logical sum of multi-Mask and the logical product of grantMask and the inverse values of all bits of holdMask, is also carried out in respect of SC10 and SA4, these modified steps being respectively shown as SC10' and SA4' in the drawings.

Furthermore, SB6 to SB9, in other words, the process of determining whether or not a CAS operation is necessary in respect of the lock status bit mask, and of creating new values to be used in the CAS operation if a CAS operation is necessary, is modified in such a manner that (1) a CAS operation is set as unnecessary (needCAS is set to FALSE) if bit(m) has been set in both grantMask and multiMask; (2) needCAS is set to TRUE and the new multiMask is set to the value set in bit(m) of the old multiMask, if bit(m) of grantMask has been set and bit(m) of multiMask has not been set; and (3) needCAS is set to TRUE and the new grantMask is set to the value set in bit(m) of the old grantMask, if bit(m) has not been set in either grantMask or multiMask (SB6', SB6", B7', B7", B8', B8" and B9').

In SC6 and SA16, it was determined whether or not the result of reading out the value of Owner[m] (Owner[w] in SA16) is 0. This was a condition determination for investigating whether or not the value is less than one, which is the maximum value of the number of threads holding locks that can be expressed by one word capable of being handled by an indivisible access command of the processor, but in the present embodiment, the maximum value of the number of threads holding locks that can be expressed by one word is two, and therefore the determination in SC6 and SA16 is changed to a condition determination for investigating "whether or not the result of reading out the value of Owner[m] (Owner[w] in SA16) is less than 2" (SC6' and SA16').

Figure 30:
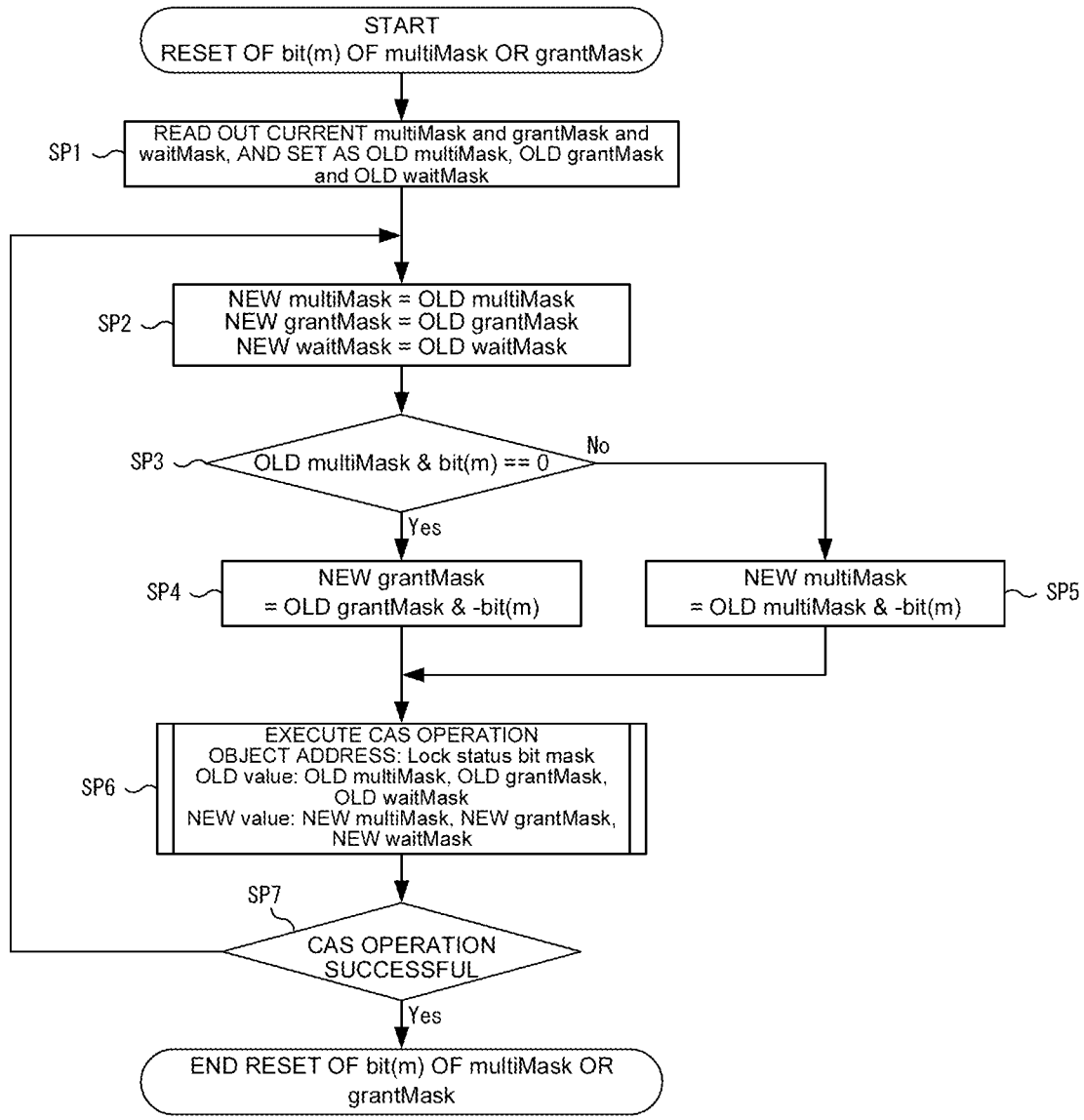
FIG. 30 is a diagram showing a flow of a lock release process in the lock management system relating to the second embodiment.
Figure 31:
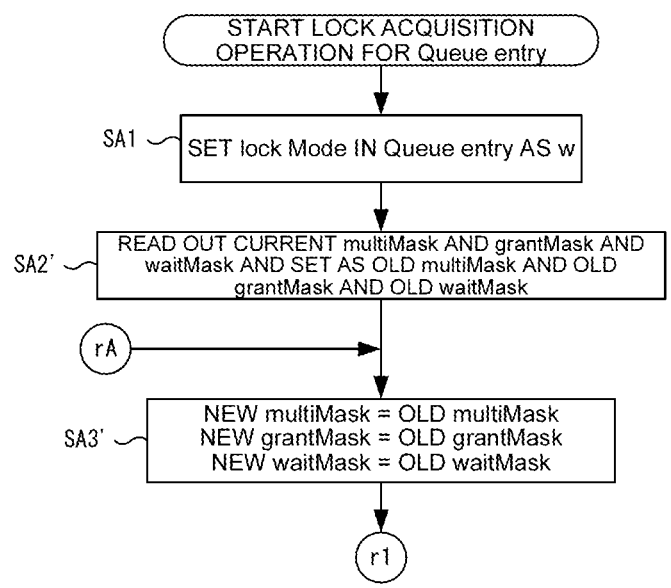
FIG. 31 is a diagram showing a flow of a lock release process in the lock management system relating to the second embodiment.
Figure 32:
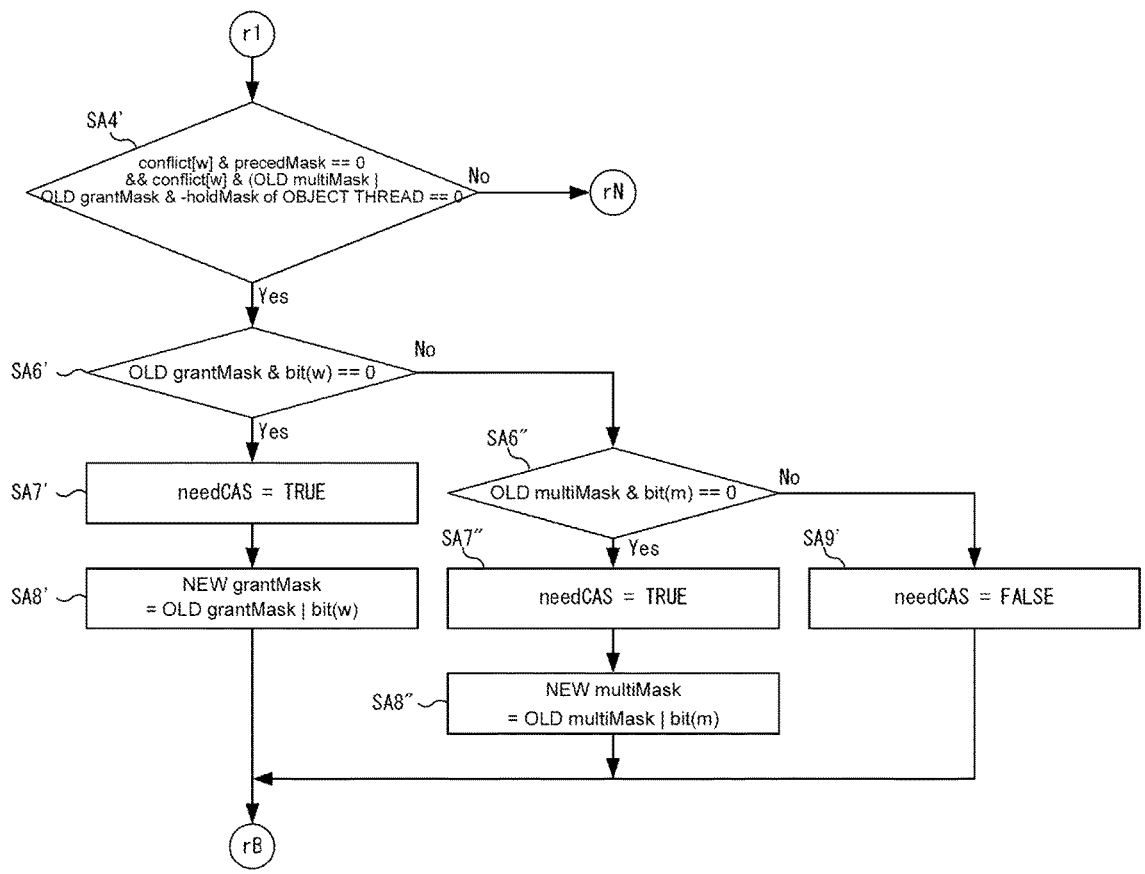
FIG. 32 is a diagram showing a flow of a lock release process in the lock management system relating to the second embodiment.
Figure 33:
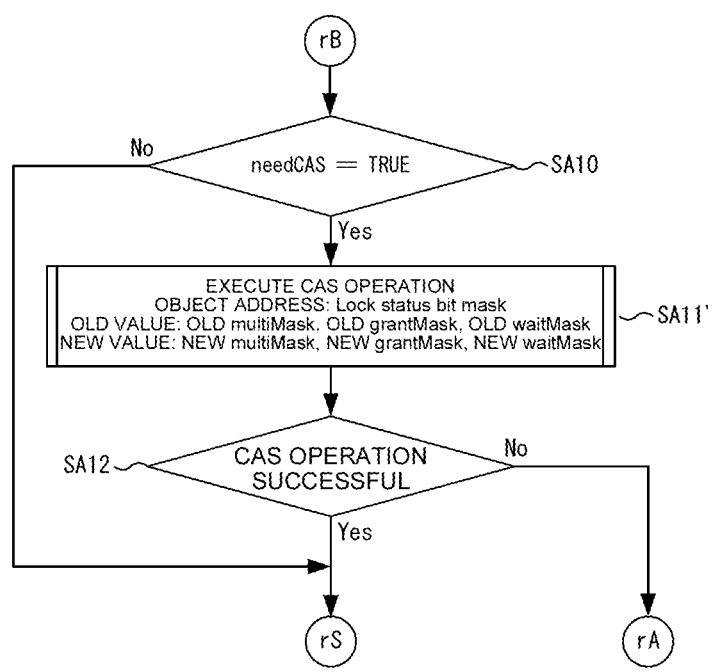
FIG. 33 is a diagram showing a flow of a lock release process in the lock management system relating to the second embodiment.
Figure 34:
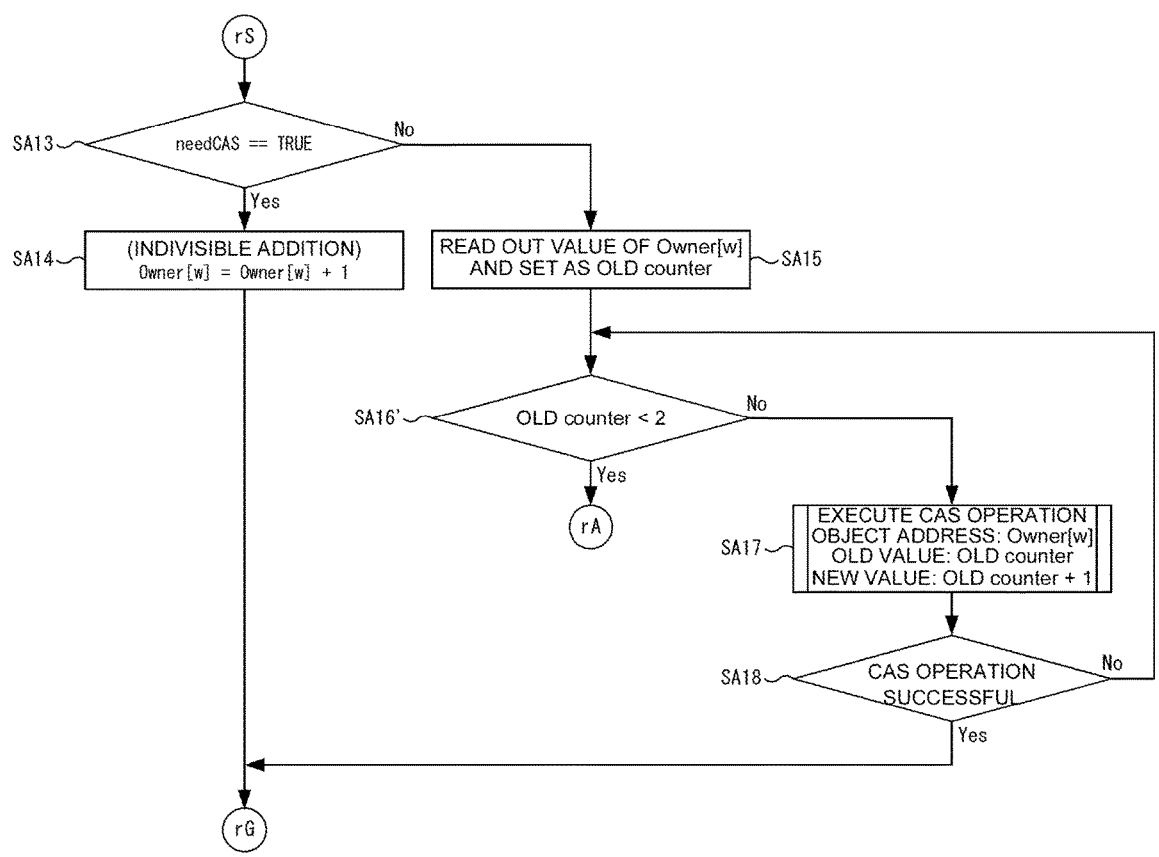
FIG. 34 is a diagram showing a flow of a lock release process in the lock management system relating to the second embodiment.

Furthermore, in the process of releasing a lock, the result obtained by decrementing Owner[m] by 1 by the indivisible subtraction in SR1 was compared with 0 in SR2, but this is changed to a process for determining whether or not the result is 1 or less (SR2'). This change corresponds to the fact that it has become possible to express up to a maximum value of two as the number of threads holding locks, by one word which can be handled by an indivisible access command of the processor. Furthermore, in SR4, bit(m) in grantMask was reset by an indivisible calculation (logical product) command, but this is changed to a process for resetting bit(m) of multiMask or grantMask by indivisible access (SR4'). The process for resetting bit(m) of multiMask or grantMask relating to SR4' is shown in FIG. 30. Referring to FIG. 30, in this process, the bit(m) in multiMask is reset (SP5) if the bit(m) in multiMask has been set (No at SP3), or the bit(m) in grantMask is reset (SP4) if the bit(m) in multiMask has not been set, and a CAS operation is carried out (SP6).

2.3 Effects of the Present Embodiment

As described above, in the present embodiment, it is possible to achieve a locking method capable of lock promotion due to the fact that the number of threads holding locks can be expressed up to a maximum value of two by one word that can be handled by an indivisible access command of the processor.

3 Additional Items

The compositions of the respective embodiments described above can be combined or portion thereof can be exchanged. Furthermore, the composition of the present invention is not limited only to the embodiments described above, and various modifications may also be applied within a scope that does not depart from the essence of the present invention.

A portion or all of the embodiments described above can be explained as Appendices indicated below, but the present invention is not limited to the following description.

APPENDIX 1

A lock management system having a multi-processor, comprising: lock acquisition means for carrying out a lock acquisition process for a thread according to one or more lock modes, at least a portion of the lock modes being a shared lock that can be acquired by one or more threads; and management means for managing the number of threads acquiring a lock, by first information which can express the number of threads by one word that can be handled by an indivisible access command of the multi-processor, and second information representing a whole range of the number of threads that can possibly acquire a lock in each lock mode.

APPENDIX 2

The lock management system described in Appendix 1, wherein the lock acquisition means includes: first means for investigating the number of threads acquired in a requested lock mode, from the first information; second means for increasing a value of the first information by the indivisible access command and also increasing a value of the second information by an indivisible calculation command of the multi-processor, if the number of threads is less than a maximum value that can be expressed by the first information; and third means for increasing the value of the second information by the indivisible access command if the number of threads is equal to or greater than the maximum value that can be handled by the first information.

APPENDIX 3

The lock management system described in Appendix 2, wherein, when the third means increases the value of the second information, if the result of reading out the second information is less than the maximum value that can be expressed by the first information, the lock acquisition means carries out the processing again from the first means.

APPENDIX 4

The lock management system as described in any one of Appendices 1 to 3, further comprising lock release means for reducing the value of the second information by an indivisible calculation command, and also, if the result of this reduction is less than the maximum of the values handled by the first information, reducing the value of the first information by the indivisible calculation command.

APPENDIX 5

A lock management method for a lock management system having a multi-processor, the method comprising the steps of: carrying out a lock acquisition process for a thread according to one or more lock modes, at least a portion of the lock modes being a shared lock that can be acquired by one or more threads; and managing the number of threads acquiring a lock, by first information which can express the number of threads by one word that can be handled by an indivisible access command of the multi-processor, and second information representing a whole range of the number of threads that can possibly acquire a lock in each lock mode.

APPENDIX 6

A lock management program which causes a lock management system having a multi-processor to execute the steps of: carrying out a lock acquisition process for a thread according to one or more lock modes, at least a portion of the lock modes being a shared lock that can be acquired by one or more threads; and managing the number of threads acquiring a lock, by first information which can express the number of threads by one word that can be handled by an indivisible access command of the multi-processor, and second information representing a whole range of the number of threads that can possibly acquire a lock in each lock mode.

This application claims priority on the basis of Japanese Patent Application No. 2012-11760 filed on May 23, 2012, the entirety of which is incorporated herein.

1: lock management system
100: processor
110: thread
200: memory
300: program
310: lock acquisition process
320: lock release process
330: thread sleep process
340: thread wake-up process
400: data
410: lock status holding means
411: lock status bit mask
413: counter sequence
415: wait queue
417: mutex
420: conflict relationship table
430: thread unique data
431: hold Mask

I claim:

1. A lock management method performed by a multi-processor, the method comprising the steps of:
carrying out a lock acquisition process for a thread according to one or more lock modes, at least a portion of the lock modes being a shared lock that can be acquired by one or more threads;
managing the number of threads acquiring a lock, by first information which can express the number of threads by one word that can be handled by an indivisible access command of the multi-processor, and second information representing a whole range of the number of threads that can possibly acquire a lock in each lock mode;
investigating the number of threads that have acquired a lock in a requested lock mode, from the first information;
increasing a value of the first information by the indivisible access command and increasing a value of the second information by an indivisible calculation command, if the number of threads is less than a maximum value that can be expressed by the first information; and
increasing the value of the second information by the indivisible access command if the number of threads is equal to or greater than the maximum value that can be handled by the first information.

2. The lock management method according to claim 1, further comprising:
carrying out processing when the value of the second information is increased, if the result of reading out the second information is less than the maximum value that can be expressed by the first information.

3. The lock management system according to claim 1, further comprising:
reducing the value of the second information by an indivisible calculation command, and also, if the result of this reduction is less than the maximum of the values handled by the first information, reducing the value of the first information by the indivisible calculation command.

4. A non-transitory storage medium storing a lock management program which causes a lock management system having a multi-processor to execute the steps of:

carrying out a lock acquisition process for a thread according to one or more lock modes, at least a portion of the lock modes being a shared lock that can be acquired by one or more threads;

managing the number of threads acquiring a lock, by first information which can express the number of threads by one word that can be handled by an indivisible access command of the multi-processor, and second information representing a whole range of the number of threads that can possibly acquire a lock in each lock mode;

investigating the number of threads that have acquired a lock in a requested lock mode, from the first information;

increasing a value of the first information by the indivisible access command and increasing a value of the second information by an indivisible calculation command, if the number of threads is less than a maximum value that can be expressed by the first information; and increasing the value of the second information by the indivisible access command if the number of threads is equal to or greater than the maximum value that can be handled by the first information.

5. The non-transitory storage medium according to claim 4, further comprising:

carrying out processing when the value of the second information is increased, if the result of reading out the second information is less than the maximum value that can be expressed by the first information.

6. The non-transitory storage medium according to claim 4, further comprising:

reducing the value of the second information by an indivisible calculation command, and also, if the result of this reduction is less than the maximum of the values handled by the first information, reducing the value of the first information by the indivisible calculation command.

* * * * *